United States Patent
Koito

(10) Patent No.: US 9,350,979 B2
(45) Date of Patent: May 24, 2016

(54) DISPLAY DEVICE

(75) Inventor: Takeo Koito, Kanagawa (JP)

(73) Assignee: Japan Display Inc., Tokyo (JP)

( * ) Notice: Subject to any disclaimer, the term of this patent is extended or adjusted under 35 U.S.C. 154(b) by 102 days.

(21) Appl. No.: 13/609,699

(22) Filed: Sep. 11, 2012

(65) Prior Publication Data

US 2013/0100175 A1    Apr. 25, 2013

(30) Foreign Application Priority Data

Oct. 20, 2011    (JP) .................................. 2011-230300

(51) Int. Cl.
*H04N 13/04*    (2006.01)
*G02B 27/22*    (2006.01)

(52) U.S. Cl.
CPC ....... *H04N 13/0409* (2013.01); *H04N 13/0415* (2013.01); *H04N 13/0422* (2013.01); *H04N 13/0447* (2013.01); *G02B 27/2214* (2013.01)

(58) Field of Classification Search
CPC ............. G02B 27/2214; G02B 27/225; G02B 27/2264; G02B 27/26; G02B 27/0172; G02B 27/22; G02B 6/0043; G02B 6/0053; G02B 13/14; G02B 13/143; G02B 27/0093; G02B 27/0101; G02B 27/2228; G02B 27/28
See application file for complete search history.

(56) References Cited

U.S. PATENT DOCUMENTS

2006/0066718 A1 * 3/2006 Yanagawa et al. .............. 348/51
2008/0266387 A1 10/2008 Krijn et al.
2009/0128547 A1 5/2009 Park
2011/0007390 A1 * 1/2011 Yanamoto ..................... 359/466
2011/0228185 A1 * 9/2011 Hamagishi ......... G02B 27/2214
349/15

FOREIGN PATENT DOCUMENTS

| JP | 2004-191570 A | 7/2004 |
|----|---------------|--------|
| JP | 2006-091642 A | 4/2006 |
| JP | 2008-513807 A | 5/2008 |
| JP | 2008-249887 A | 10/2008 |
| JP | 2009-520231 A | 5/2009 |
| JP | 2009-520236 A | 5/2009 |
| JP | 2010-044181   | 2/2010 |

(Continued)

OTHER PUBLICATIONS

Japanese Office Action issued Mar. 3, 2015 for corresponding Japanese Application No. 2011-230300.

(Continued)

*Primary Examiner* — Kenneth B Lee, Jr.
(74) *Attorney, Agent, or Firm* — Michael Best & Friedrich LLP

(57) ABSTRACT

A display device including: an image display section in which unit pixels each composed of a plurality of sub-pixels corresponding to a plurality of colors are arranged; and an optical element having a window section allocating light emitted from the image display section in units of the sub-pixels to a plurality of viewpoints, wherein a color arrangement of the sub-pixels of the image display section or an arrangement of the window section of the optical element is set such that, when the image display section is viewed from each of the plurality of viewpoints, in an arrangement of colors of light allocated by the window section of the optical element, a same color is not arranged linearly in a predetermined number of sub-pixels or more in succession in any of a row direction, a column direction, and an oblique direction.

11 Claims, 20 Drawing Sheets

(56) References Cited

FOREIGN PATENT DOCUMENTS

| JP | 2011-017788 A | 1/2011 |
| JP | 2011-043623 A | 3/2011 |
| JP | 2011-170241 A | 9/2011 |
| JP | 2011-197676 A | 10/2011 |
| WO | WO-2006/033447 A2 | 3/2006 |

OTHER PUBLICATIONS

Japanese Office Action mailed Jun. 24, 2014 in corresponding Japanese Application No. 2011-230300.

* cited by examiner

FIG. 6A
FIG. 6B
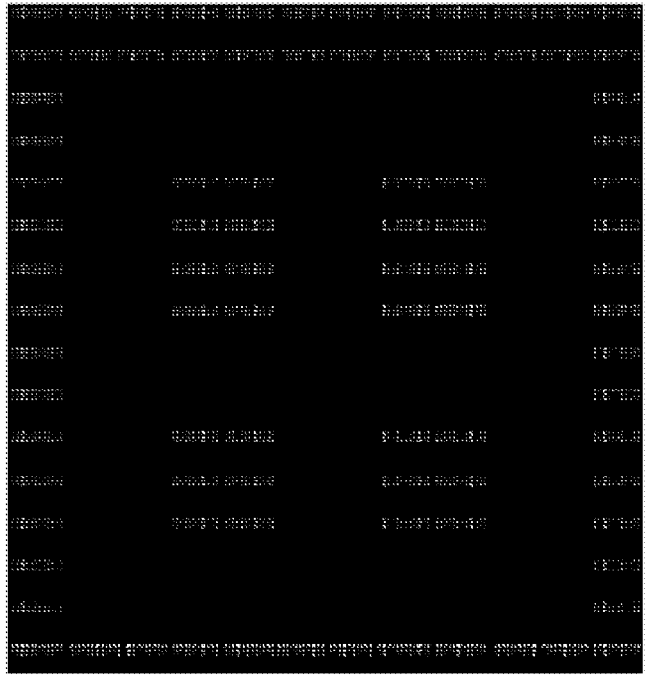
BACKGROUND COLOR: GREEN ⇒ 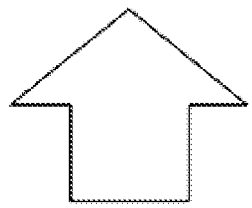 BLACK CHARACTER DISPLAY OF CHINESE CHARACTER "田"

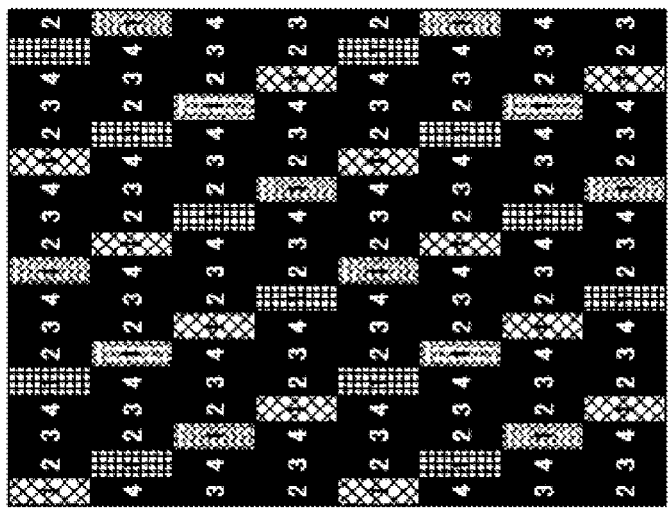
FIG. 7C
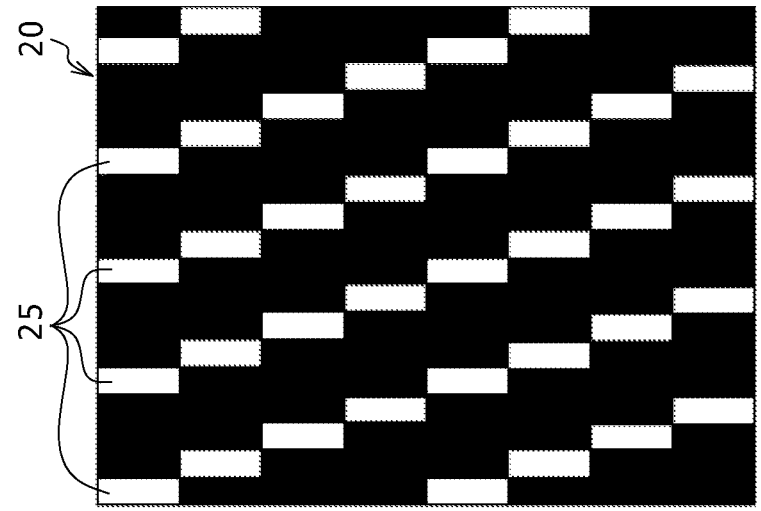
FIG. 7B
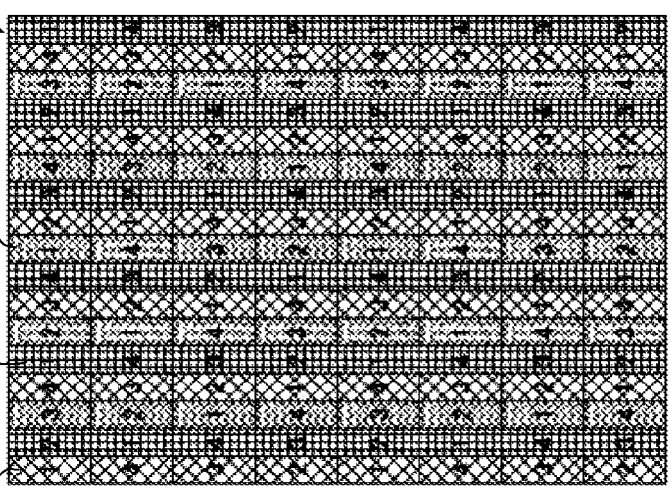
FIG. 7A

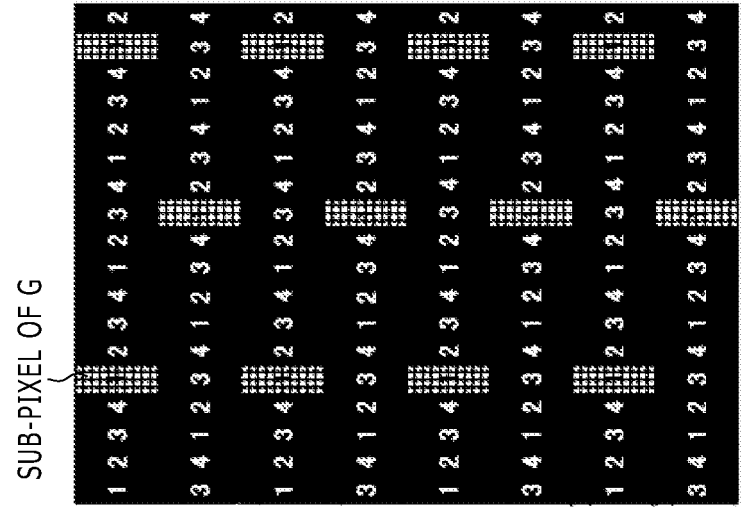
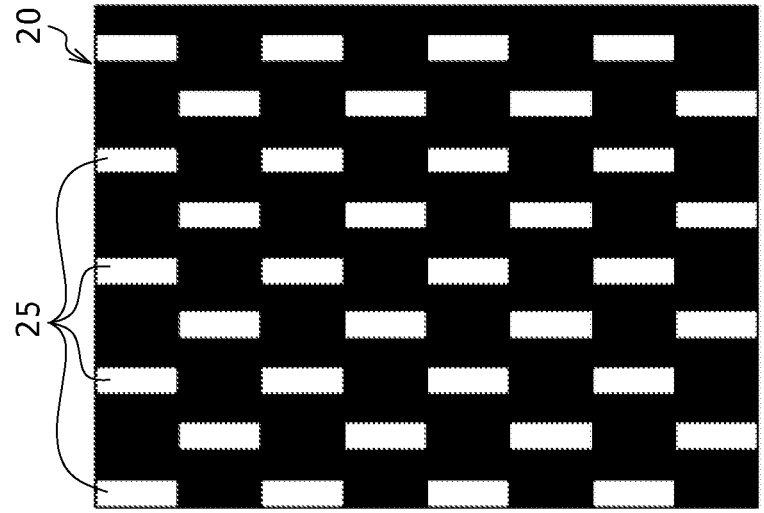
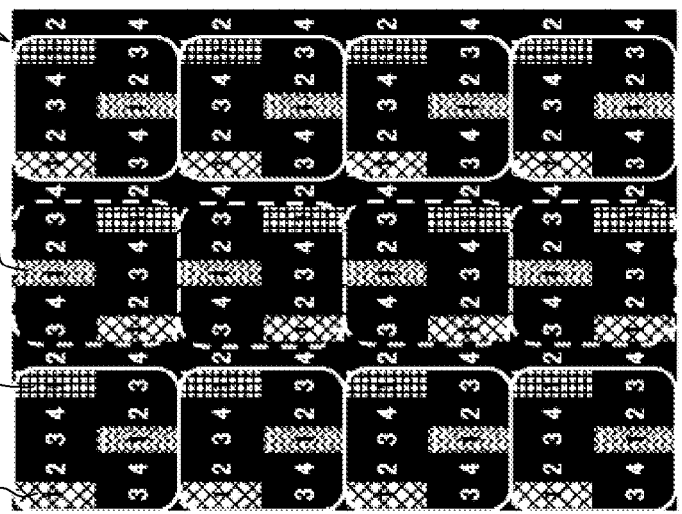
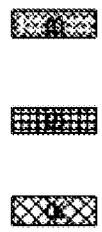

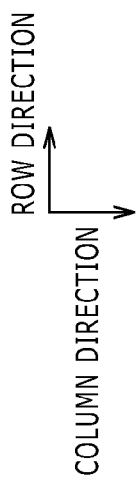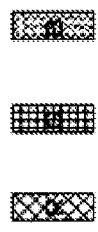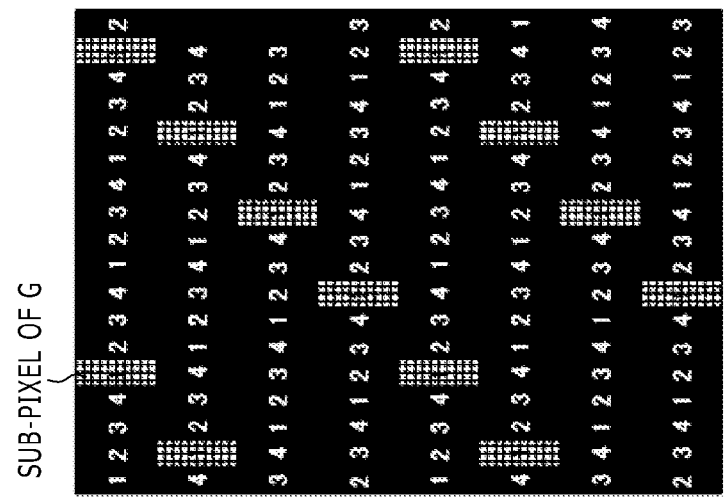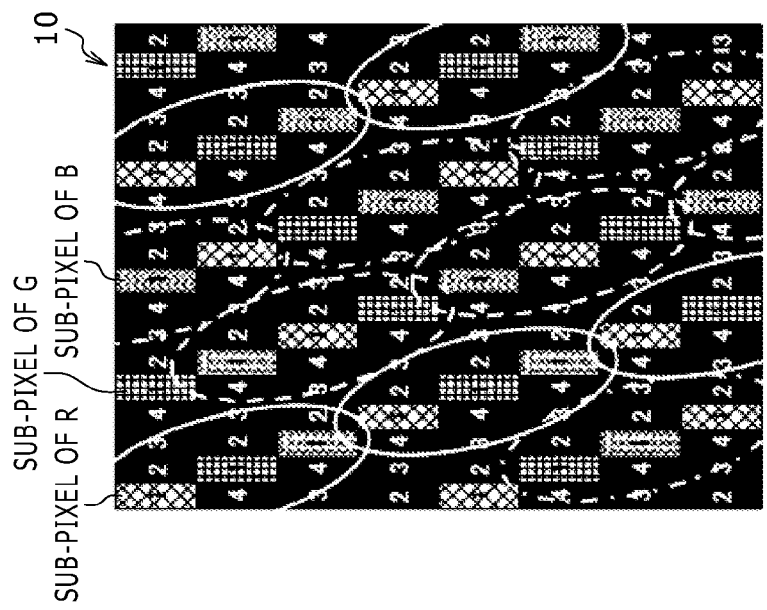
FIG. 9A  FIG. 9B  FIG. 9C

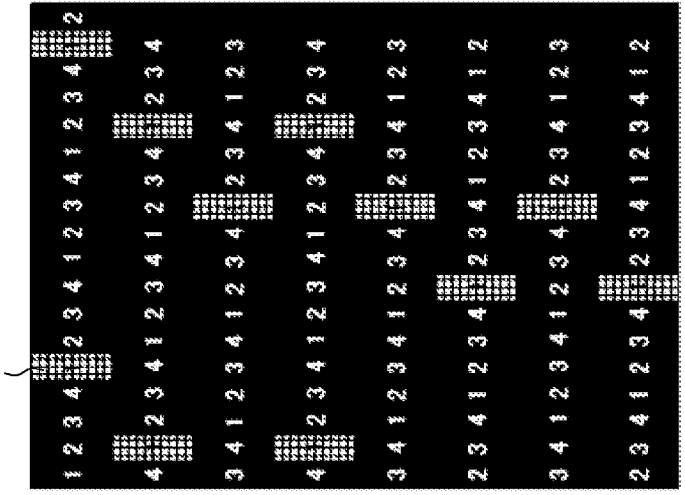
FIG.11C
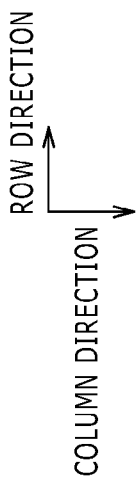
FIG.11B
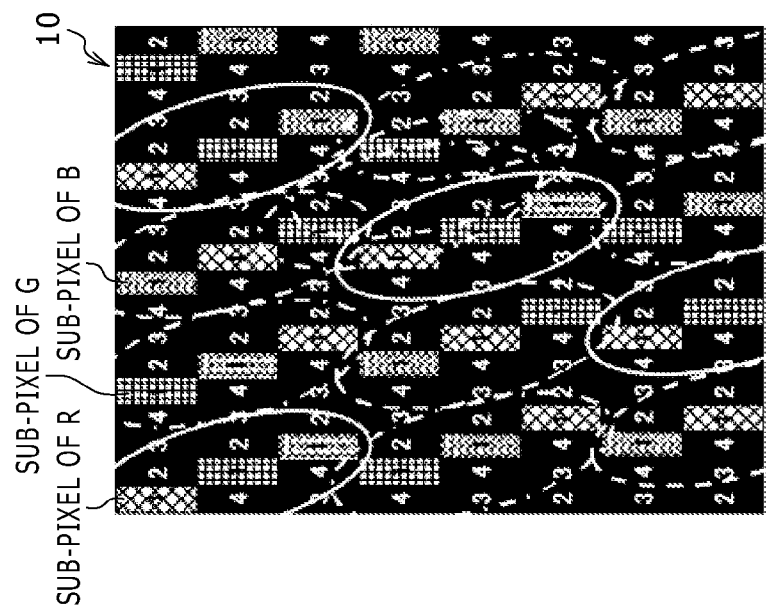
FIG.11A

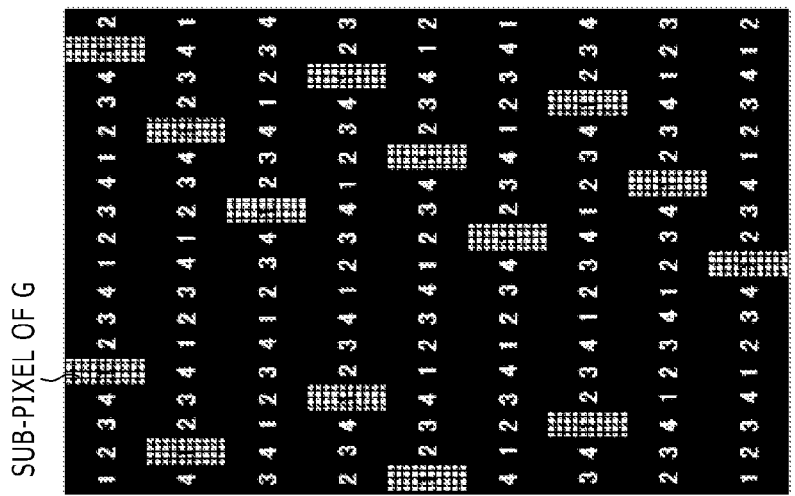
FIG.16C
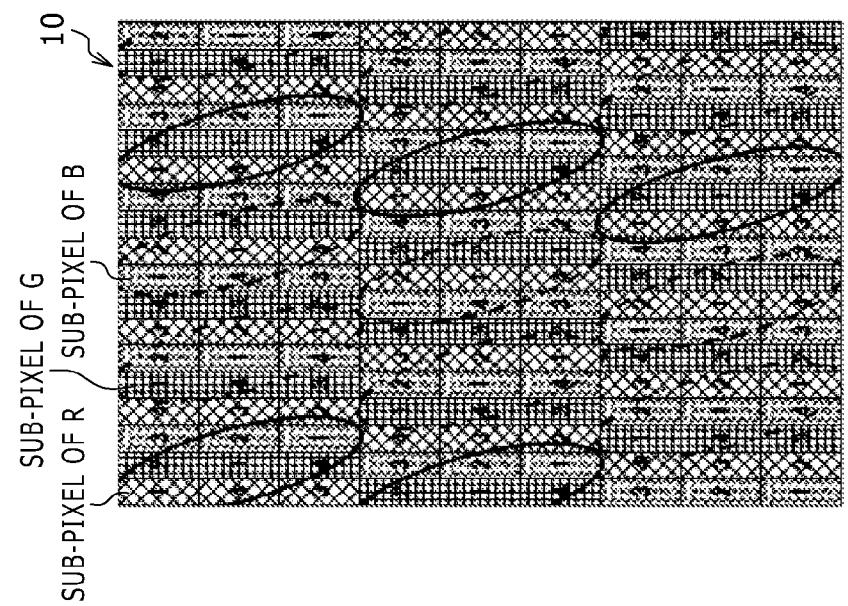
FIG.16B
FIG.16A

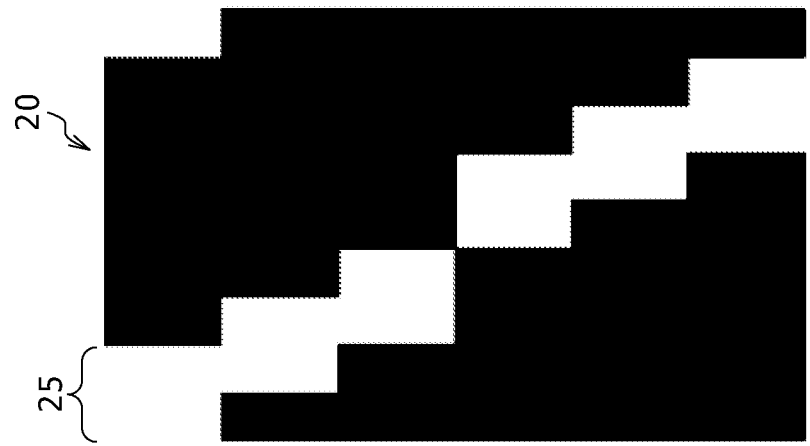
FIG. 19C
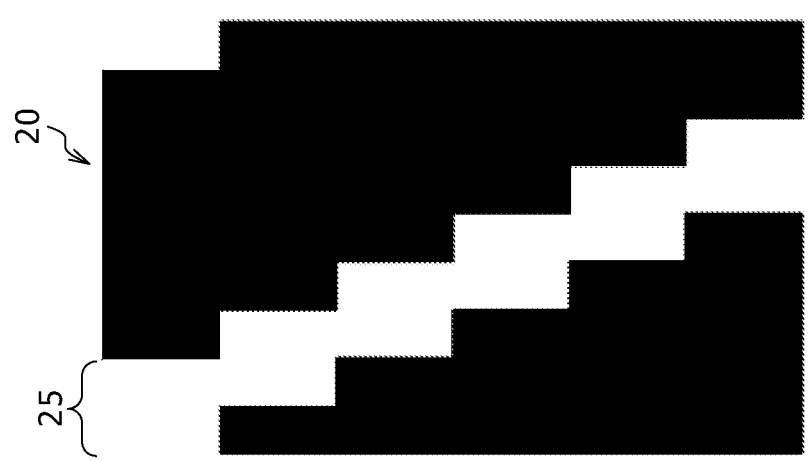
FIG. 19B
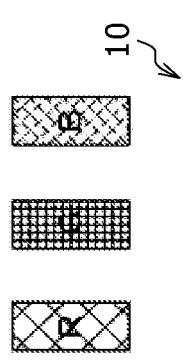
FIG. 19A
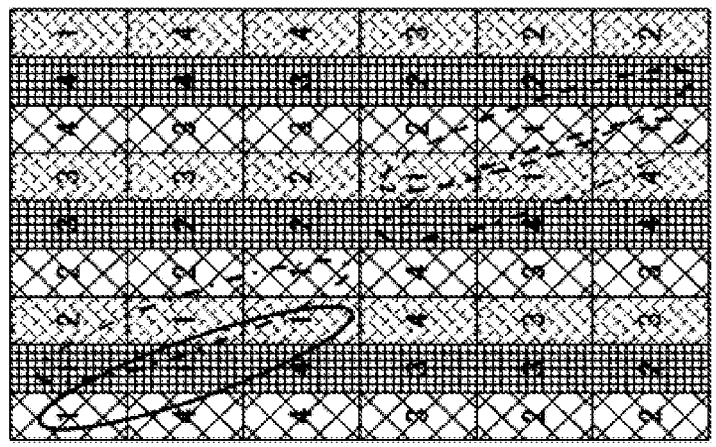

DISPLAY DEVICE

BACKGROUND

The present disclosure relates to a display device.

There are display devices for realizing a stereoscopic vision when an image observer observes two or more images with parallax or disparity (which images may be referred to simply as "parallax images"). Methods for realizing stereoscopic vision in display devices of this kind include various systems. Among the various systems, systems such as a barrier system and a lens system are the mainstream systems.

In cases of these systems, a special optical element enabling parallax images to be perceived three-dimensionally, that is, an optical element such as a barrier, a lens, or the like is disposed on the display surface side of an image display section, and the optical element controls the direction of light emitted from the image display section. Meanwhile, on the side of the image display section, control is performed so as to allocate pixels according to the positions of viewpoints: for example, for a right eye and a left eye in a case of stereoscopic images (three-dimensional images) with a binocular parallax; and for a first viewpoint, a second viewpoint, a third viewpoint, . . . in a case of stereoscopic images with multiple parallaxes. Therefore, stereoscopic images are degraded in resolution because the number of pixels for each viewpoint in the stereoscopic images is reduced as compared with a planar image (two-dimensional image) displayed by the same display device.

As a measure against this, in a related art, degradation in resolution in a horizontal direction is suppressed by forming light emitting pixels of a backlight having a function of a barrier in stepwise oblique light emitting pixel columns (see Japanese Patent Laid-Open No. 2010-44181, for example).

SUMMARY

The above-described related art in which the barrier is in a stepwise form does not present a problem when a natural image is displayed, but deteriorates visibility more than degradation in resolution when an image composed of a monotone set of pixels such as a geometric figure or a character is displayed. This is because when an image composed of a monotone set of pixels is allocated to viewpoints, information in a same column, row, oblique direction, or the like may lack, thus causing a loss of a part of an image as well as coloring, absence of information, and the like in a case of a geometric figure or a character.

Incidentally, while the above description refers to a display device displaying stereoscopic images (three-dimensional images), similar principles apply to display devices capable of displaying different images according to an angle at which the image display section is viewed by controlling the direction of light emitted from an image display section with an optical element such as a barrier or the like. The above problems are therefore true for not only display devices displaying stereoscopic images but also display devices displaying different images according to a viewing angle.

It is therefore desirable to provide a display device that can improve visibility at a time of displaying images composed of a monotone set of pixels, such as a geometric figure or a character in particular.

According to an embodiment of the present disclosure, there is provided a display device including: an image display section in which unit pixels each composed of a plurality of sub-pixels corresponding to a plurality of colors are arranged; and an optical element having a window section allocating light emitted from the image display section in units of the sub-pixels to a plurality of viewpoints, wherein a color arrangement of the sub-pixels of the image display section or an arrangement of the window section of the optical element is set such that, when the image display section is viewed from each of the plurality of viewpoints, in an arrangement of colors of light allocated by the window section of the optical element, a same color is not arranged linearly in a predetermined number of sub-pixels or more in succession in any of a row direction, a column direction, and an oblique direction.

Here, "row direction" refers to a direction in which pixels are arranged in pixel rows, that is, a direction along the pixel rows. "Column direction" refers to a direction in which pixels are arranged in pixel columns, that is, a direction along the pixel columns.

In the display device of the above-described constitution, when the image display section is viewed from each of the plurality of viewpoints, if a same color is not arranged linearly in a predetermined number of sub-pixels or more in succession in any of the row direction, the column direction, and the oblique direction within the arrangement of colors of light allocated by the window section of the optical element, the absence of information, for example, in a same column, row, and oblique direction can be avoided when allocating images composed of a monotone set of pixels to viewpoints.

The display device according to this embodiment of the present disclosure can prevent the absence of information, for example, in a same column, row, and oblique direction at a time of allocating images composed of a monotone set of pixels to viewpoints. Therefore, visibility can be improved when displaying images composed of a monotone set of pixels such for example as a geometric figure or a character in particular.

BRIEF DESCRIPTION OF THE DRAWINGS

FIGS. 6A and 6B are diagrams showing an image displayed in 2D display and in 3D display, respectively, in a case where a Chinese character (kanji) composed of a square and a plus therein (□ with+therein) is displayed on a screen in black with a background color of green;

FIGS. 7A, 7B, and 7C are diagrams for assistance in explaining problems in a case of four viewpoints when the color arrangement of the pixels of the image display section and the arrangement of the transmitting sections of the parallax barrier have regularity;

FIGS. 8A, 8B, and 8C are diagrams for assistance in explaining problems in a case of four viewpoints when the pixels of the image display section are in a stripe arrangement and the transmitting sections of the parallax barrier are in a delta arrangement;

FIGS. 9A, 9B, and 9C are diagrams for further consideration of the case illustrated in FIGS. 7A to 7C;

FIGS. 11A, 11B, and 11C are diagrams for assistance in explaining relation between the color arrangement of the pixels of the image display section and the arrangement of the transmitting sections of the parallax barrier in the case of four viewpoints according to a first example;

FIGS. 16A, 16B, and 16C are diagrams for assistance in explaining relation between the color arrangement of the pixels of the image display section and the arrangement of the transmitting sections of the parallax barrier in the case of four viewpoints according to a sixth example;

FIGS. 19A, 19B, and 19C are diagrams for assistance in explaining relation between the color arrangement of the pixels of the image display section and the arrangement of the transmitting sections of the parallax barrier in the case of four viewpoints according to a ninth example.

DETAILED DESCRIPTION OF THE PREFERRED EMBODIMENTS

Figure 1:
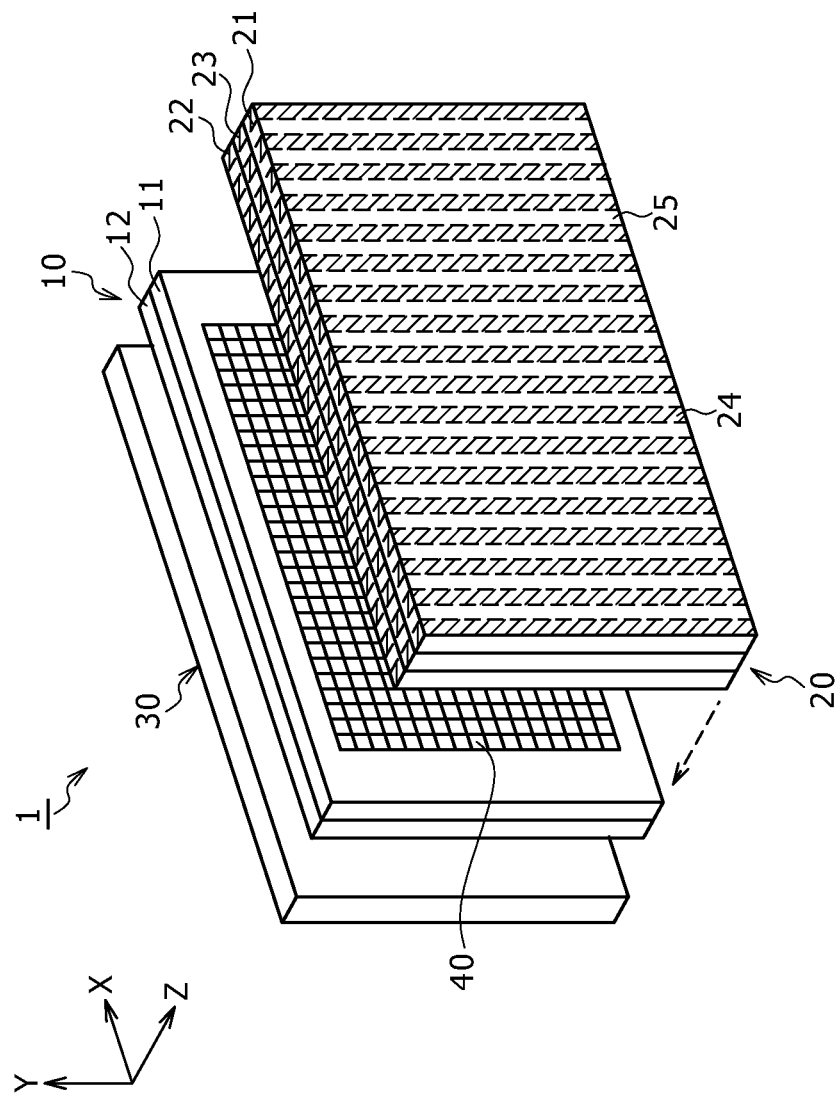
FIG. 1 is a schematic perspective view of a stereoscopic image display device of a parallax barrier system according to an embodiment of the present disclosure where constituent elements thereof are virtually separated from each other.

The present disclosure will hereinafter be described on the basis of embodiments thereof with reference to the drawings. The present disclosure is not limited to the embodiments, and various numerical values and the like in the embodiments are examples. In the following description, identical elements or elements having identical functions are identified by the same reference numerals, and repeated description thereof will be omitted. Incidentally, the description will be made in the following order.

1. Display Device According to Embodiment of Present Disclosure, General Description
2. Stereoscopic Image Display Device According to Embodiment of Present Disclosure

[Display Device According to Embodiment of Present Disclosure, General Description]

A display device according to an embodiment of the present disclosure includes an image display section in which unit pixels each composed of a plurality of sub-pixels corresponding to a plurality of colors are arranged and an optical element for allocating light emitted from the image display section in units of the sub-pixels to a plurality of viewpoints, or in other words, allocating the sub-pixels according to the positions of the plurality of viewpoints. A unit pixel is one unit for forming a color image, and is composed of three sub-pixels corresponding to the three primary colors of red (R), green (G), and blue (B), for example.

The unit pixels are not limited to the configuration composed of a combination of sub-pixels corresponding to the three primary colors of RGB. The unit pixels can be of a configuration composed of a combination of sub-pixels corresponding to complementary colors of cyan (C), magenta (M), and yellow (Y) or the like, or of a configuration obtained by further adding a sub-pixel corresponding to one color or sub-pixels corresponding to a plurality of colors to sub-pixels corresponding to the three primary colors. More specifically, for example, a unit pixel can be formed adding a sub-pixel corresponding to white (W) to improve luminance, or adding at least one sub-pixel corresponding to a complementary color of yellow (Y) or another color so as to extend the range of color reproduction.

The display device according to the embodiment of the present disclosure displays a plurality of images by allocating light emitted from the image display section in units of the sub-pixels to a plurality of viewpoints. An example of a display device of this kind is a stereoscopic image display device for realizing a stereoscopic vision by allowing an image observer to observe two or more images having a parallax or disparity (which images may hereinafter be referred to simply as "parallax images"). Stereoscopic image display devices are roughly classified into an eyeglass system that separates and inputs parallax images into a left eye and a right eye through eyeglasses and a naked-eye system that inputs parallax images into a left eye and a right eye through a special optical element without using eyeglasses.

In a stereoscopic image display device of the naked-eye system, a special optical element allocates light emitted from the image display section in units of sub-pixels to a plurality of viewpoints, or in other words, allocates the sub-pixels according to the positions of the plurality of viewpoints. It is therefore possible for an image observer to perceive parallax images three-dimensionally (to provide the image as a stereoscopic image). The stereoscopic image display device using this special optical element includes various systems such as a parallax barrier system using a parallax barrier as the special optical element, a lenticular lens system using a lenticular lens as the special optical element, a liquid crystal lens system using a liquid crystal lens as the special optical element, and so on.

Examples of a display device that display a plurality of images by allocating light emitted from an image display section in units of sub-pixels to a plurality of viewpoints include not only stereoscopic image display devices but also multiple-screen display devices (for example, so-called two-screen display devices). A multiple-screen display device displays different images depending on an angle at which an image observer observes an image display section, and thereby separately provides a plurality of two-dimensional images displayed by the image display section to a plurality of image observers.

A well-known display panel such as a liquid crystal display panel, an electroluminescence display panel, a plasma display panel, or the like can be used as the image display section used in the display device according to the embodiment of the present disclosure. A transmissive type liquid crystal display panel is used as an image display section in a stereoscopic image display device according to another embodiment to be described later.

The liquid crystal display panel includes for example a front panel (such as a substrate or a color filter substrate) including a transparent common electrode, a rear panel (such as a substrate or an array substrate) having transparent pixel electrodes, and a liquid crystal material disposed between the front panel and the rear panel. The operation mode of the liquid crystal display panel is not specifically limited. The liquid crystal display panel may be configured to be driven in the so-called TN mode, or may be configured to be driven in the VA mode or IPS mode.

When the number M×N of pixels of the image display section is denoted as (M, N), examples of values of (M, N) are some of the resolutions for image display, specifically VGA (640, 480), S-VGA (800, 600), XGA (1024, 768), APRC (1152, 900), S-XGA (1280, 1024), U-XGA (1600, 1200), HD-TV (1920, 1080), and Q-XGA (2024, 1536) as well as (1920, 1035), (720, 480), (1280, 960), and so forth. However, the values of (M, N) are not limited to these values.

A well-known illuminating device can be used as a backlight section (illuminating section) for illuminating the transmissive type liquid crystal display panel from a rear surface side. The configuration of the illuminating section is not specifically limited. The backlight section can be composed of well-known members such as a light source, a prism sheet, a diffusion sheet, a light guide plate, etc.

A driving circuit for driving the image display section can be formed of various circuits including well-known circuit elements.

In the display device according to this embodiment of the present disclosure, a color arrangement of the sub-pixels of the image display section is set such that, when the image display section is viewed from each of the plurality of viewpoints, in the arrangement of colors of light allocated by a window section of the optical element, a same color is not arranged linearly in a predetermined number of sub-pixels or more in succession in a row direction, a column direction, or an oblique direction.

Alternatively, in the display device according to the embodiment of the present disclosure, an arrangement of the window section of the optical element is set such that, when the image display section is viewed from each of the plurality of viewpoints, in the arrangement of colors of light allocated by the window section of the optical element, a same color is not arranged linearly in a predetermined number of sub-pixels or more in succession in a row direction, a column direction, or an oblique direction.

When a same color is thus not arranged linearly in a predetermined number of sub-pixels or more in succession in a row direction, a column direction, or an oblique direction in each of the arrangements of colors of light allocated by the window section of the optical element, that is, in each of the arrangements observed when the image display section is viewed from the plurality of viewpoints, absence of information in a same column, row, or oblique direction can be avoided at a time an image composed of a monotone set of pixels is allocated to viewpoints. It is therefore possible to improve visibility of when displaying images composed of a monotone set of pixels, such as a geometric figure or a character in particular.

Various kinds of conditions shown in the present specification are satisfied not only when they hold strictly but also when they hold in effect. The presence of various variations occurring in design or in manufacturing is tolerated.

[Stereoscopic Image Display Device According to Embodiment of Present Disclosure]

As one example of display devices according to embodiments of the present disclosure, a stereoscopic image display device will be described in the following. It is supposed that the stereoscopic image display device of this embodiment is a stereoscopic image display device of a parallax barrier system using a parallax barrier as an optical element for enabling parallax images perceived (provided) as stereoscopic images by allocating light emitted from an image display section in units of sub-pixels to a plurality of viewpoints.

FIG. 1 is a schematic perspective view of the stereoscopic image display device of the parallax barrier system according to the embodiment where constituent elements thereof are virtually separated from each other.

As shown in FIG. 1, the stereoscopic image display device 1 according to this embodiment includes: an image display section 10 capable of displaying a parallax image; a parallax barrier 20 as an optical element for allowing the parallax image perceived (provided) as a stereoscopic image; and a backlight section 30 disposed on the rear surface side of the image display section 10.

The image display section 10 is formed of a liquid crystal display panel, for example. The liquid crystal display panel is for example composed of a front panel 11, a rear panel 12, and a liquid crystal material (not shown) disposed between the front panel 11 and the rear panel 12. The front panel 11 has a transparent common electrode provided so as to be common to all pixels. The rear panel 12 has pixels 40 arranged therein in the form of a two-dimensional matrix. The rear panel 12 has transparent pixel electrodes provided for each pixels 40.

As the parallax barrier 20, there are a variable barrier in which barriers (light shielding sections) are formed selectively and a fixed barrier in which barriers are formed in a fixed state. The variable barrier functions to allow parallax images perceived as a stereoscopic image (three-dimensional images) in a state where the barriers are formed, and does not perform this function in a state where the barriers are not being formed. The variable barrier is therefore maintained in the state where the barriers are not being formed when displaying an ordinary planar image (two-dimensional image).

On the other hand, the fixed barrier is always in a state that it functions to make parallax images perceived as a stereoscopic image. Thus, when the fixed barrier is used as the parallax barrier 20 in a stereoscopic image display device capable of also displaying a planar image, the image display section 10 displays two images without a parallax as an image for a right eye and an image for a left eye when displaying a planar image.

Suppose that a variable barrier is used as the parallax barrier 20 in the stereoscopic image display device 1 according to the present embodiment. In addition, suppose that a parallax barrier of a liquid crystal system that forms barriers (light shielding sections) using liquid crystals is used as the variable barrier, for example. However, the use of a fixed barrier as the parallax barrier 20 is not excluded.

The parallax barrier 20 of the liquid crystal system includes two glass substrates 21 and 22 and a liquid crystal layer 23 formed by sealing a liquid crystal material in a sealed space between the glass substrates 21 and 22. A sealing section for sealing the liquid crystal material between the glass substrates 21 and 22 is not shown in order to simplify the drawing. One of the glass substrates 21 and 22 has stripe-shaped transparent electrodes formed therein at certain intervals in a direction in which pixels in pixel columns of the image display section 10 are arranged (column direction), that is, a vertical direction (Y-direction in FIG. 1). The other one of the glass substrates 21 and 22 has a transparent common electrode formed substantially over the entire surface of the glass substrate.

When a voltage is applied between the stripe-shaped transparent electrodes and the transparent common electrode in the parallax barrier 20 of the liquid crystal system, light shielding sections (barriers) 24 are formed in the form of stripes at certain intervals so as to correspond to the stripe-shaped transparent electrodes. FIG. 1 shows the light shielding sections 24 by hatching. Transmitting sections 25 are formed between these stripe-shaped light shielding sections 24. FIG. 1 shows the transmitting sections 25 as white stripes. The transmitting sections 25 of the parallax barrier 20 correspond to the window section of the optical element for allocating light emitted from the image display section 10 in units of the pixels (sub-pixels) 40 to a plurality of viewpoints.

The parallax barrier 20 of the liquid crystal system having the above-described configuration is used in combination with the image display section 10, and has functions of the optical element enabling parallax images displayed by the image display section 10 to be perceived three-dimensionally. That is, applying a voltage between the stripe-shaped transparent electrodes and the transparent common electrode and thereby alternately forming the stripe-shaped light shielding sections 24 and the stripe-shaped transmitting sections 25 at certain intervals, a parallax image displayed by the image display section 10 can be perceived (provided) as a stereoscopic image (three-dimensional images) by an image observer.

When no voltage is applied between the stripe-shaped transparent electrodes and the transparent common electrode, on the other hand, the liquid crystal layer 23 is in a transmitting state (transmitting sections) over the entire surface of the liquid crystal layer 23. In this case, the parallax barrier 20 of the liquid crystal system does not perform (does not have) the functions of the optical element enabling parallax images displayed by the image display section 10 to be perceived three-dimensionally. Thus, when no voltage is applied between the stripe-shaped transparent electrodes and the transparent common electrode, an ordinary planar image (two-dimensional image) is displayed instead of a stereoscopic image.

The backlight section 30 is an illuminating section of a surface light source type that illuminates the entire surface of the image display section 10 from the rear surface side thereof. The configuration of the backlight section 30 is not specifically limited. The backlight section 30 can be composed of well-known members such as a light source, a prism sheet, a diffusion sheet, a light guide plate, and the like. A well-known light source, such as an LED, a cold-cathode tube, or the like, can be used as the light source of the backlight section 30. The LED, in particular, is a light source having a wide range of color reproduction.

Figure 2:
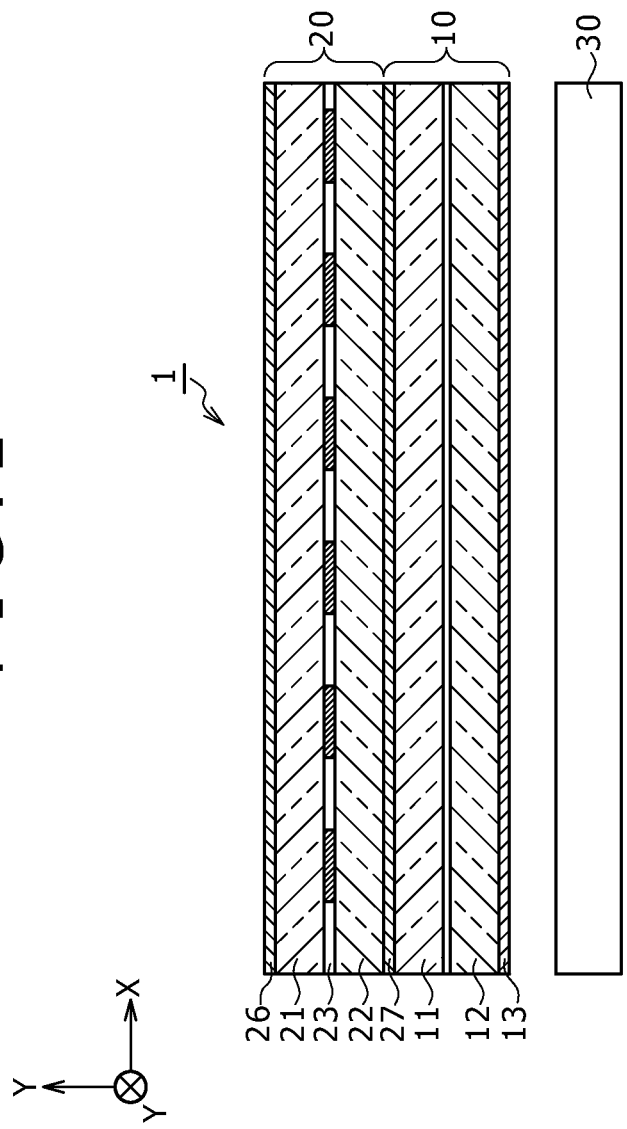
FIG. 2 is a horizontal sectional view of the stereoscopic image display device according to the embodiment.

FIG. 2 is a horizontal sectional view of the stereoscopic image display device 1 according to the present embodiment. As shown in FIG. 2, a polarizer 13 is disposed on the rear surface of the image display section 10 formed of the liquid crystal display panel, that is, on the surface of the rear panel 12 on the side of the backlight section 30. In addition, polarizers 26 and 27 are respectively disposed on the surface of the glass substrate 21 on the side of a display surface and on the surface of the glass substrate 22 on the side of the image display section 10 in the parallax barrier 20 of the liquid crystal system.

(Principles of Parallax Barrier System)

Principles of the parallax barrier system will be described in the following. Incidentally, the parallax barrier system includes a binocular parallax system, a multi-parallax system with three or more viewpoints, a step barrier system, and so on. Outlines of the principles of the parallax barrier system will be described with reference to FIG. 3 by taking the binocular parallax system as an example.

In the pixel array in the image display section 10 in the form of a matrix, pixels (sub-pixels) are divided in units of pixel columns into a group of pixels $R_1$, $R_3$, $R_5$, $R_7$, and $R_9$ for the right eye used to display an image for the right eye and a group of pixels $L_2$, $L_4$, $L_6$, $L_8$, and $L_{10}$ for the left eye used to display an image for the left eye. In other words, the pixel array is such that the pixel columns of the group of pixels $R_1$, $R_3$, $R_5$, $R_7$, and $R_9$ and the pixel columns of the group of pixels $L_2$, $L_4$, $L_6$, $L_8$, and $L_{10}$ are arranged alternately.

A video signal for the right eye is supplied from a signal source (not shown) for the right eye to the group of pixels $R_1$, $R_3$, $R_5$, $R_7$, and $R_9$ for the right eye in units of pixel columns. In addition, a video signal for the left eye is supplied from a signal source (not shown) for the left eye to the group of pixels $L_2$, $L_4$, $L_6$, $L_8$, and $L_{10}$ for the left eye in units of pixel columns. The two images of the image for the right eye and the image for the left eye, that is, the parallax images can thus be displayed on the image display section 10.

Figure 3A:
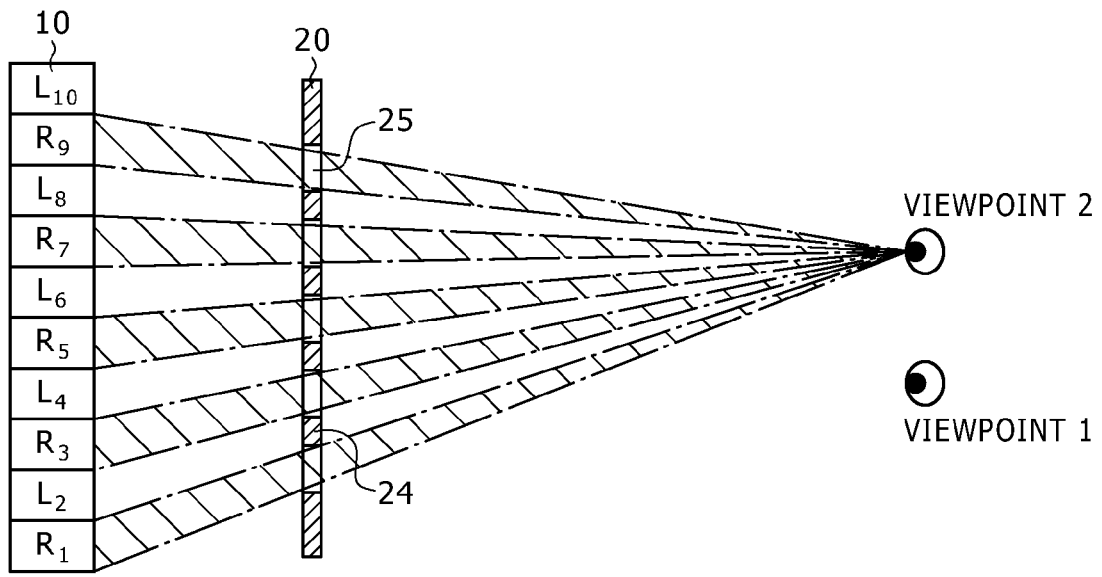
FIGS. 3A and 3B are schematic diagrams for assistance in explaining principles of the parallax barrier system in a case of a binocular parallax.
Figure 3B:
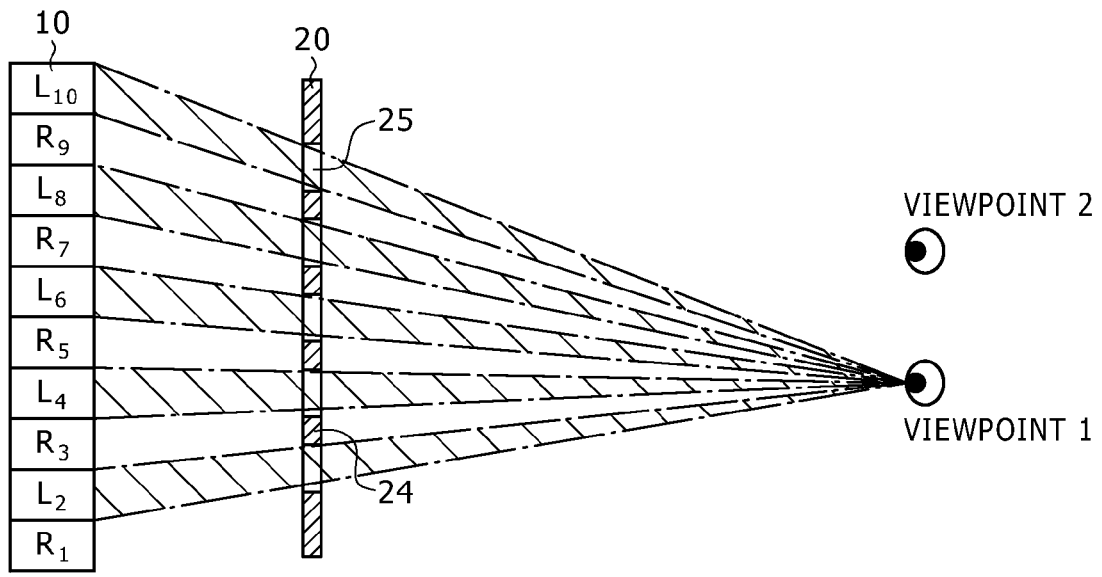

In a state where the parallax images are being displayed on the image display section 10, as shown in FIG. 3A, a group of light rays emitted from the pixels $R_1$, $R_3$, $R_5$, $R_7$, and $R_9$ for the right eye reaches a second viewpoint through the transmitting sections 25 of the parallax barrier 20. In addition, as shown in FIG. 3B, a group of light rays emitted from the pixels $L_2$, $L_4$, $L_6$, $L_8$, and $L_{10}$ for the left eye reaches a first viewpoint through the transmitting sections 25 of the parallax barrier 20.

Thus, the image for the first viewpoint and the image for the second viewpoint are observed independently of each other at a position at a predetermined distance from the display surface of the image display section 10. Specifically, when the left eye and the right eye of an image observer are situated at the first viewpoint and the second viewpoint, that is, when the image observer observes the images at the position at the predetermined distance from the display surface of the image display section 10, the parallax images displayed by the image display section 10 enter the left eye and the right eye of the image observer as the image for the left eye and the image for the right eye. As a result, a binocular parallax occurs, and the image observer can observe (perceive) the parallax image displayed by the image display section 10 three-dimensionally, that is, as a stereoscopic image.

Figure 4:
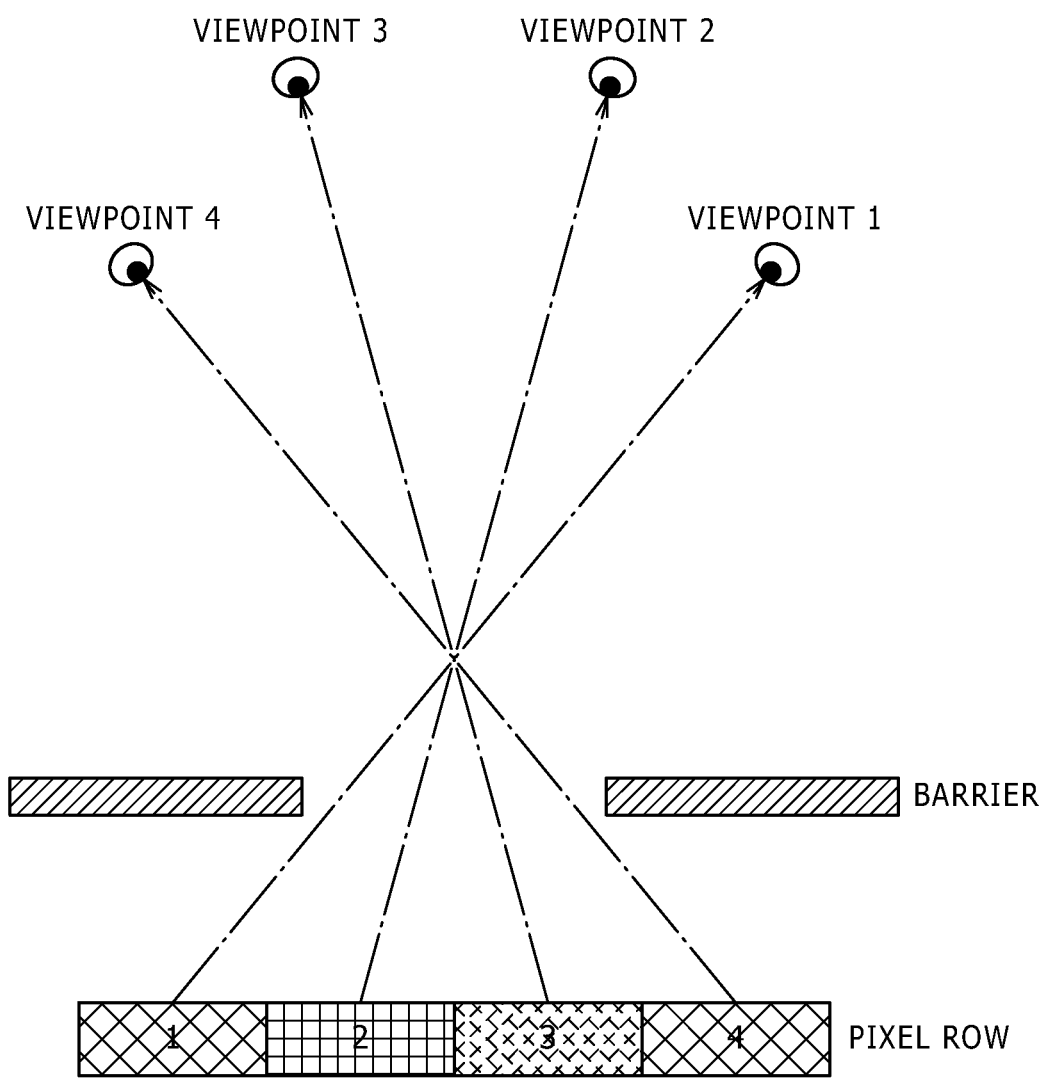
FIG. 4 is a diagram for assistance in explaining the allocation of pixels in a pixel row/column to respective viewpoints in a multi-parallax system.

The principles of the parallax barrier system have been described above by taking as an example a case of a binocular parallax. In general, as shown in FIG. 4, the parallax barrier 20 acts to display a plurality of images by allocating the pixels (sub-pixels) in a pixel row to a plurality of viewpoints (four viewpoints in the present example) according to the respective positions of the viewpoints.

The principles of displaying an image by allocating pixels according to the positions of viewpoints are similar to those of the lenticular lens system, the liquid crystal lens system, and the like. Thus, not only the parallax barrier 20 but also a lenticular lens, a liquid crystal lens, or the like can be used as the optical element for allocating light emitted from the image display section 10 in units of sub-pixels to a plurality of viewpoints, or in other words, allocating the sub-pixels according to the positions of the plurality of viewpoints.

In addition, in the above-described embodiment, the parallax barrier 20 is disposed on the display surface side of the image display section 10. However, the parallax barrier 20 can be disposed on the side opposite to the display surface of the image display section 10, that is, on a display rear surface side.

Further, in the above-described embodiment, a stereoscopic image display device has been described. However, the present technology is applicable to display devices in general that display a plurality of images by allocating sub-pixels to a plurality of viewpoints according to the respective positions of the viewpoints, including, in addition to stereoscopic image display devices, two-screen display devices that display different images according to an angle at which the image display section is observed.

(Color Arrangement of Pixels of Image Display Section and Arrangement of Transmitting Sections of Parallax Barrier)

In the image display section 10, one pixel as a unit forming a color image (i.e., a unit pixel) is composed of three sub-pixels corresponding to the three primary colors of RGB, for example (which sub-pixels may hereinafter be referred to simply as "pixels"). These sub-pixels correspond to the pixels 40 shown in FIG. 1. The so-called stripe arrangement in which the sub-pixels corresponding to the three primary colors of RGB are arranged in units of pixel columns is generally adopted as the color arrangement of the pixels 40 of the image display section 10.

The arrangement of the transmitting sections 25 of the parallax barrier 20 includes a step barrier system, a delta (Δ) barrier system, a straight barrier (stripe barrier) system, and so on. In the following, the arrangement of the step barrier system may be referred to as a step barrier arrangement, the arrangement of the delta barrier system may be referred to as a delta barrier arrangement, and the arrangement of the straight barrier system may be referred to as a straight barrier arrangement. Incidentally, FIG. 1 shows the straight barrier arrangement in order to simplify the drawing.

Thus, the color arrangement of the pixels 40 of the image display section 10 and the arrangement of the transmitting sections 25 of the parallax barrier 20 each have regularity. This enables excellent image display when an ordinary planar image (two-dimensional image) is displayed. However, when a stereoscopic image (three-dimensional image) is displayed, the pixels allocated to each viewpoint are arranged linearly in color units for each viewpoint in a row (horizontal) direction, a column (vertical) direction, or an oblique direction, so that a problem such as a deformation or absence of a character, coloring occurs. This problem will be more concretely described in the following.

Figures 5A, 5B, 5C:
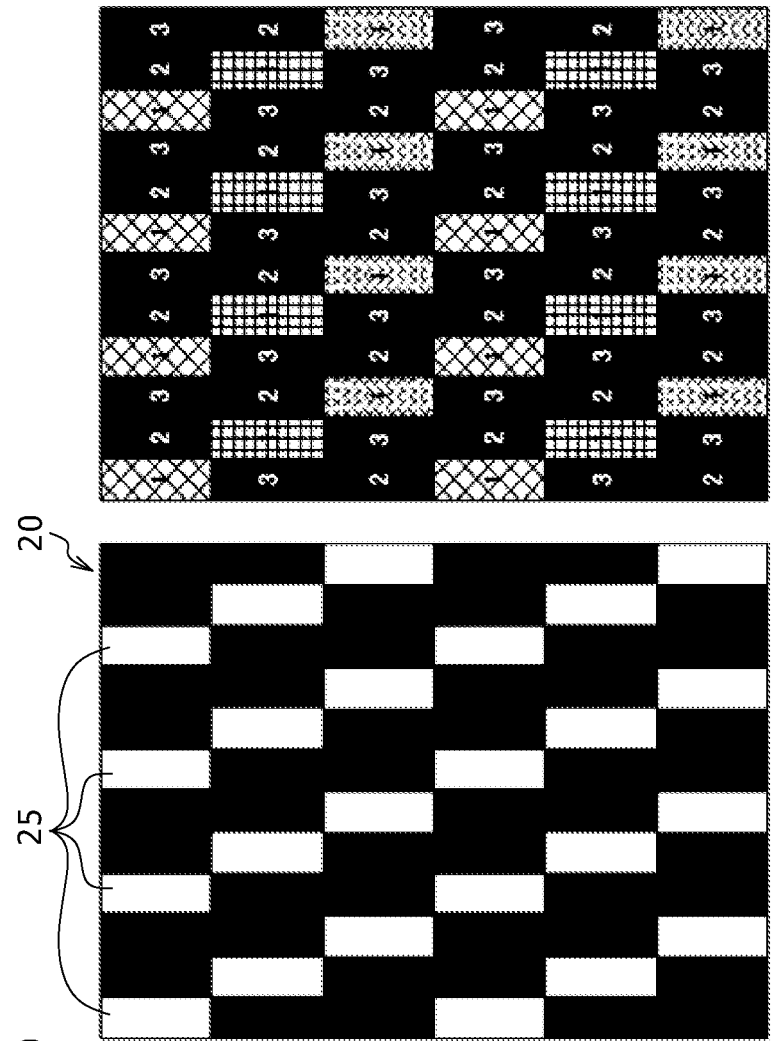
FIGS. 5A, 5B, and 5C are diagrams for assistance in explaining problems in a case of three viewpoints when the color arrangement of the pixels of an image display section and the arrangement of the transmitting sections of a parallax barrier have regularity.

The problem in a case of three viewpoints will be described with reference to FIGS. 5A to 5C. FIG. 5A shows the stripe arrangement of the pixels 40 in the image display section 10. FIG. 5B shows the arrangement of the step barrier system of the transmitting sections 25 in the parallax barrier 20. FIG. 5C shows pixels allocated to the first viewpoint. Numbers given in the pixels in FIGS. 5A and 5C represent their viewpoint position. The same applies to diagrams of other examples.

According to such a combination of the stripe arrangement of the pixels 40 in the image display section 10 and the step barrier arrangement of the transmitting sections 25 in the parallax barrier 20 in the case of three viewpoints, as shown in FIG. 5C, the pixels allocated to the first viewpoint are arranged so as to continue linearly in the row direction (horizontal direction) and the column direction (vertical direction) in color units. Thus, when a character or a figure or the like including a horizontal straight line is displayed against a single background color, the character or the figure is deformed.

In order to facilitate understanding, an example where a Chinese character (kanji) composed of a square and a plus therein (□ with+therein), made up of a set of straight lines, is displayed on a screen in black with a background color of green is described. This character can be displayed excellently in a case of display of a two-dimensional (2D) image, as shown in FIG. 6A. On the other hand, in a case of display of a three-dimensional (3D) image, as shown in FIG. 6B, only one row/column in every three rows/columns is allocated for each viewpoint. Thus, when the lines forming the character do not have a thickness of three or more rows/columns, there may be a missing part in the character. Incidentally, FIG. 6B show an image arriving at the first viewpoint (or pixels of G allocated to the first viewpoint).

In addition, in a case other than single-color display, for example a case where a black character is displayed on a screen with a background color of white, when the character includes a horizontal line, the character will have no missing part. However, unless three colors are drawn together (unless line width is a multiple of three), or in other words, when one color or two colors remain, color balance is lost, so that the character is colored (this is the so-called coloring).

The problem in a case of four viewpoints will next be described with reference to FIGS. 7A to 7C. FIG. 7A shows the stripe arrangement of the pixels 40 of the image display section 10. FIG. 7B shows the arrangement of the step barrier system of the transmitting sections 25 in the parallax barrier 20. FIG. 7C shows pixels allocated to the first viewpoint at a time of white display.

According to such a combination of the stripe arrangement of the pixels 40 of the image display section 10 and the step barrier arrangement of the transmitting sections 25 of the parallax barrier 20 in the case of four viewpoints, as shown in FIG. 7C, the pixels allocated to the first viewpoint are arranged so as to continue linearly in an oblique direction in color units. More specifically, the pixels allocated to the first viewpoint are arranged so as to continue linearly in an oblique direction from a lower left (upper right) to an upper right (lower left). In this case as well, unless an oblique line has a thickness of three rows/three columns or more, the character may be chipped for reasons similar to those in the case of three viewpoints.

The problem in a case of four viewpoints where the pixels 40 of the image display section 10 are in a stripe arrangement and the transmitting sections 25 of the parallax barrier 20 are in a delta arrangement will next be described with reference to FIGS. 8A to 8C. FIG. 8A shows the color arrangement of pixels allocated to the first viewpoint at a time of white display. FIG. 8B shows the delta arrangement of the transmitting sections 25 of the parallax barrier 20. FIG. 8C shows pixels allocated to the first viewpoint at a time of single-color display (in this case, pixels of G).

As shown in FIG. 8B, the delta arrangement is formed by pairing two upper and lower pixel rows as one set, and shifting transmitting sections 25 in the two pixel rows from each other by two pixels (sub-pixels). The pair of two upper and lower pixel rows are arranged so as to be repeated in the column direction.

In the case of this delta arrangement, the relation of the transmitting sections 25 in the pair of two upper and lower pixel rows forming a delta arrangement is arranged in a regular pattern between two upper and lower sets. Thus, as is clear from FIG. 8B, the transmitting sections 25 of the parallax barrier 20 are arranged consecutively in a row direction, a column direction, and an oblique direction.

In such a case of arrangement for pixel allocation by the parallax barrier 20 in which the transmitting sections 25 are arranged consecutively in the row direction, the column direction, and the oblique direction, as shown in FIG. 8A, RGB combinations enclosed by white solid lines and RGB combinations enclosed by white broken lines each form a stripe-shaped arrangement. When a single color (G in the present example) is viewed in this color arrangement, as shown in FIG. 8C, the pixels of G allocated to the first viewpoint are arranged so as to continue linearly in the column direction (vertical direction). Therefore a vertical line included in a character or a geometric figure may suffer such a problem that the character or the geometric figure is deformed.

Referring to FIGS. 9A to 9C, further consideration will be given to the case of FIGS. 7A to 7C, that is, the case of four viewpoints where the pixels 40 of the image display section 10 are in a stripe arrangement and the transmitting sections 25 of the parallax barrier 20 are in a step barrier arrangement. FIG. 9A shows the color arrangement of the pixels allocated to the first viewpoint at a time of white display, which corresponds to FIG. 7C. FIG. 9B shows the arrangement of the transmitting sections 25 of the parallax barrier 20, which corresponds to FIG. 7B. FIG. 9C shows the pixels allocated to the first viewpoint at a time of single-color display (pixels of G in this example).

As shown in FIG. 9B, for the stripe arrangement of the image display section 10 shown in FIG. 7A, the transmitting sections 25 of the parallax barrier 20 have a step barrier arrangement with four rows as a unit, in which one pixel row has a period of four pixels (sub-pixels) and the transmitting sections 25 are shifted every pixel row sequentially by one pixel in the row direction. This step barrier arrangement with four rows as a unit is arranged so as to be repeated in the column direction. The transmitting sections 25 of the parallax barrier 20 thereby form an arrangement continuing in an oblique direction.

Because of the consecutive arrangement of the transmitting sections 25, as shown in FIG. 9A, the color arrangement of the pixels allocated to the first viewpoint as viewed from a same row is a monotone pattern in which repetitions of an RGB pixel group enclosed by a white solid line, a GBR pixel group enclosed by white alternate long and short dashed lines, and a BRG pixel group enclosed by a white broken line form oblique straight lines. When a single color (G in the present example) is viewed in the color arrangement of this monotone pattern, as shown in FIG. 9C, the single color is arranged consecutively in a certain direction, that is, an oblique direction. Therefore, it is difficult to perform oblique display under the arrangement in which the single color continues in the certain direction.

(Characteristic Parts of Embodiment)

In the stereoscopic image display device 1 according to the present embodiment, the color arrangement of the pixels (sub-pixels) 40 of the image display section 10 or the arrangement of the transmitting sections 25 of the parallax barrier 20 is set as below in order to improve visibility when displaying an image composed of a monotone set of pixels, such as a geometric figure or a character in particular. The transmitting sections 25 of the parallax barrier 20 in this case correspond to the window section of the optical element for allocating light emitted from the image display section 10 in units of pixels (sub-pixels) 40 to a plurality of viewpoints, or in other words, allocating the sub-pixels to the plurality of viewpoints according to the respective positions of the viewpoints.

Specifically, the color arrangement of the pixels (sub-pixels) of the image display section 10 is set such that, when the image display section 10 is viewed from each of the plurality of viewpoints, in the arrangement of colors of light allocated by the transmitting sections 25 of the parallax barrier 20, a same color is not arranged linearly in a predetermined number of sub-pixels or more in succession in the row direction, the column direction, or the oblique direction. Alternatively, the arrangement of the transmitting sections 25 of the parallax barrier 20 is set such that, when the image display section 10 is viewed from each of the plurality of viewpoints, in the arrangement of colors of light allocated by the transmitting sections 25 of the parallax barrier 20, a same color is not arranged linearly in a predetermined number of sub-pixels or more in succession in the row direction, the column direction, or the oblique direction.

When a same color is not arranged linearly in a predetermined number of sub-pixels or more in succession in the row direction, the column direction, or the oblique direction in each of the arrangements of colors of light allocated by the transmitting sections 25 of the parallax barrier 20, that is, each of the arrangements observed when the image display section 10 is viewed from each of the plurality of viewpoints, the following effect can be obtained. The absence of information in a same column, row, oblique direction, or the like can be avoided at a time of allocating images composed of a monotone set of pixels to respective viewpoints. It is therefore possible to improve visibility of when displaying images composed of a monotone set of pixels, such as a geometric figure or a character in particular.

Here, a common example of a case where the transmitting sections 25 of the parallax barrier 20 have a step barrier arrangement as a basic form with N viewpoints (N is a natural number of two or larger) is described. In related arts, as shown in FIG. 10A, the viewpoint position number is sequentially decremented by one in the column direction in an RGB stripe arrangement (corresponding to the case of four viewpoints shown in FIG. 7A). In this case, as has also been described above, the pixels of a single color allocated to each viewpoint are arranged linearly in succession in the row direction, the column direction, or the oblique direction, thus degrading visibility of when displaying an image composed of a monotone set of pixels such for example as a geometric figure or a character.

Figure 10B:
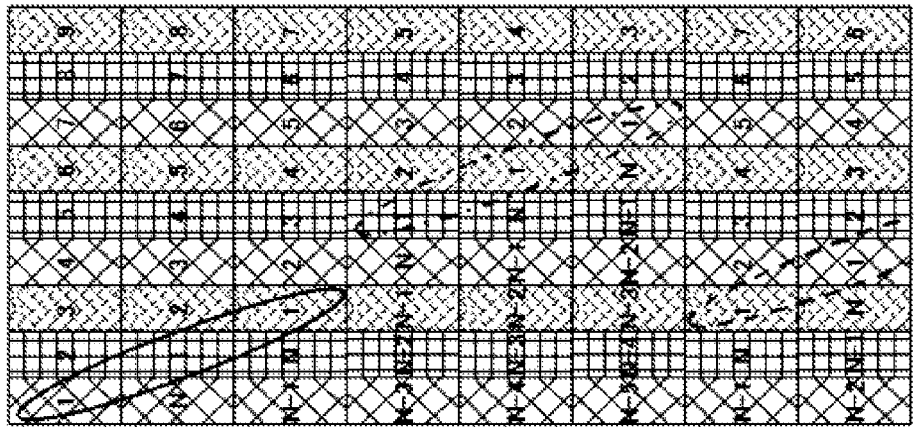
FIGS. 10A and 10B are diagrams for assistance in explaining a related art and the present embodiment, respectively, in a case of N viewpoints as a common example.
Figure 10A:
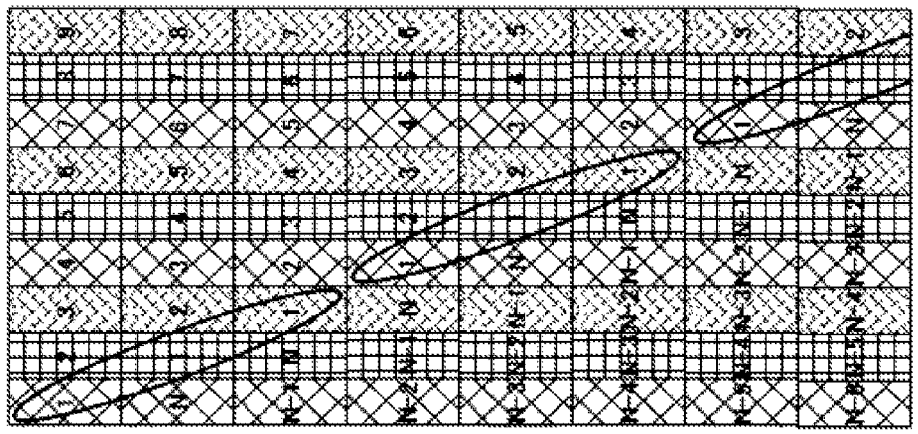

Meanwhile, in this embodiment, as shown in FIG. 10B, three rows corresponding to three sub-pixels of RGB are set as one unit, and steps are formed so as to be discontinuous in the column direction by shifting viewpoint position numbers in the row direction. Alternatively, it is also possible to change the color combination or the direction of the steps of the step barrier arrangement. The adoption of such a configuration can improve visibility of when displaying an image composed of a monotone set of pixels such for example as a geometric figure or a character.

Description will be made in the following of concrete examples of the color arrangement of the pixels (sub-pixels) 40 in the image display section 10 and the arrangement of the transmitting sections 25 of the parallax barrier 20, which are designed to improve visibility of when displaying images composed of a monotone set of pixels such for example as a geometric figure or a character.

FIRST EXAMPLE

FIGS. 11A to 11C are diagrams for assistance in explaining the color arrangement of the pixels in the image display section and the arrangement of the transmitting sections of the parallax barrier in the case of four viewpoints according to a first example. FIG. 11A shows the color arrangement of the pixels allocated to the first viewpoint at a time of white display. FIG. 11B shows the arrangement of the transmitting sections 25 of the parallax barrier 20. FIG. 11C shows the pixels allocated to the first viewpoint at a time of single-color display (pixels of G in the present example). Numbers given in the pixels in FIGS. 11A and 11C represent viewpoint positions. The same applies to diagrams of other examples.

First, the color arrangement of the pixels (sub-pixels) 40 of the image display section 10 is the stripe arrangement shown in FIG. 7A. Specifically, the color arrangement of the pixels of the image display section 10 with four viewpoints is a stripe arrangement in which sub-pixels of RGB are for example arranged in that order in units of pixel columns. The sub-pixels of RGB may be arranged in any order. The same applies to the other examples.

For the stripe arrangement of this image display section 10, as shown in FIG. 11B, the transmitting sections 25 of the parallax barrier 20 according to the first example have a step barrier arrangement in which one pixel row has a period of four pixels (sub-pixels) corresponding to the four viewpoints, and the transmitting sections 25 are shifted every pixel row by one pixel sequentially in a direction in which the pixel column number increases (right direction in the figure). Further, in this arrangement, three successive rows constitute one unit. This step barrier arrangement of three rows as one unit is arranged repetitively in the column direction such that they are shifted in order by one pixel in the direction in which pixel column numbers increase.

Thus, when the amount of shift (shift width) of steps is not fixed in the case adopting the step barrier arrangement as a basic form, the transmitting sections 25 of the parallax barrier 20 according to the first example will have such an arrangement that the steps are discontinuous in an oblique direction with three rows as one unit.

Because of the discontinuous arrangement of the transmitting sections 25, as shown in FIG. 11A, the color arrangement of the pixels allocated to the first viewpoint as viewed from a same row will be a pattern in which an RGB pixel group enclosed by a white solid line, a GBR pixel group enclosed by white alternate long and short dashed lines, and a BRG pixel group enclosed by a white broken line are shifted in the row direction in the next repetition. When a single color (G in the present example) is viewed in the color arrangement, as shown in FIG. 11C, the single color is arranged linearly in certain directions, specifically the column direction (vertical direction) and the oblique direction, but is not arranged in a predetermined number of sub-pixels (four sub-pixels in the present example) or more in succession.

When a same color is thus not arranged linearly in a predetermined number of sub-pixels or more in succession in a certain direction in an arrangement of colors of light allocated by the transmitting sections 25 of the parallax barrier 20 when the image display section 10 is viewed from each of the plurality of viewpoints, the absence of oblique information can be avoided when allocating images composed of a monotone set of pixels to the respective viewpoints. It is therefore possible to improve visibility at a time displaying images composed of a monotone set of pixels such for example as a geometric figure or a character in particular.

SECOND EXAMPLE

Figure 12C:
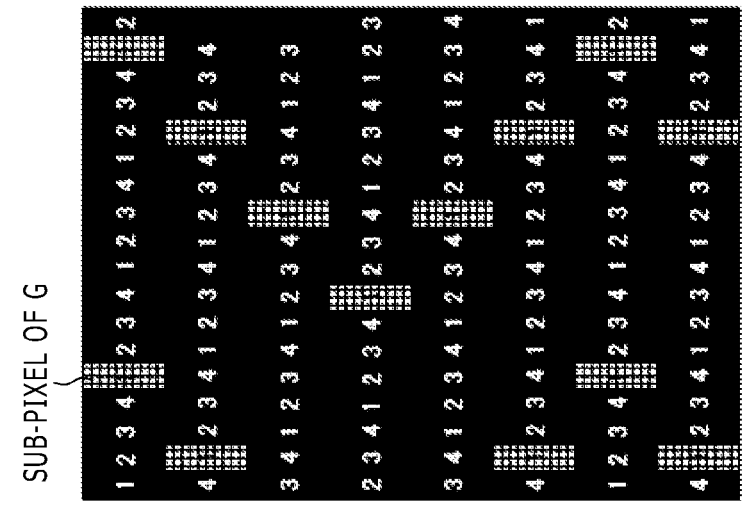
FIGS. 12A, 12B, and 12C are diagrams for assistance in explaining relation between the color arrangement of the pixels of the image display section and the arrangement of the transmitting sections of the parallax barrier in the case of four viewpoints according to a second example.
Figure 12B:
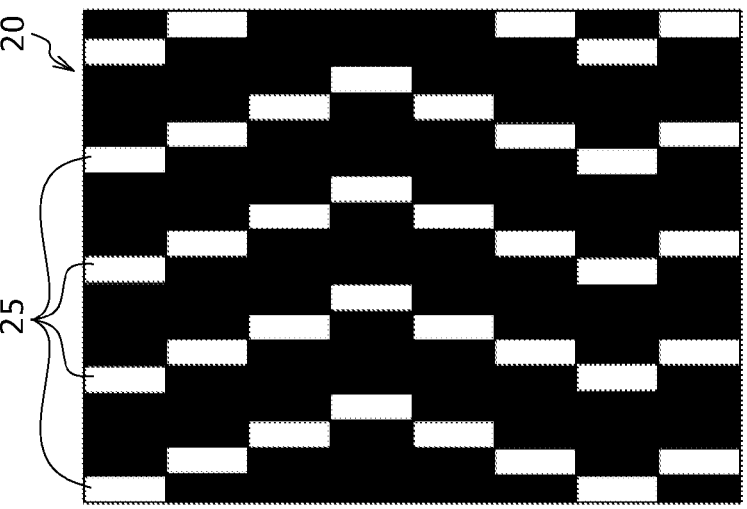
Figure 12A:
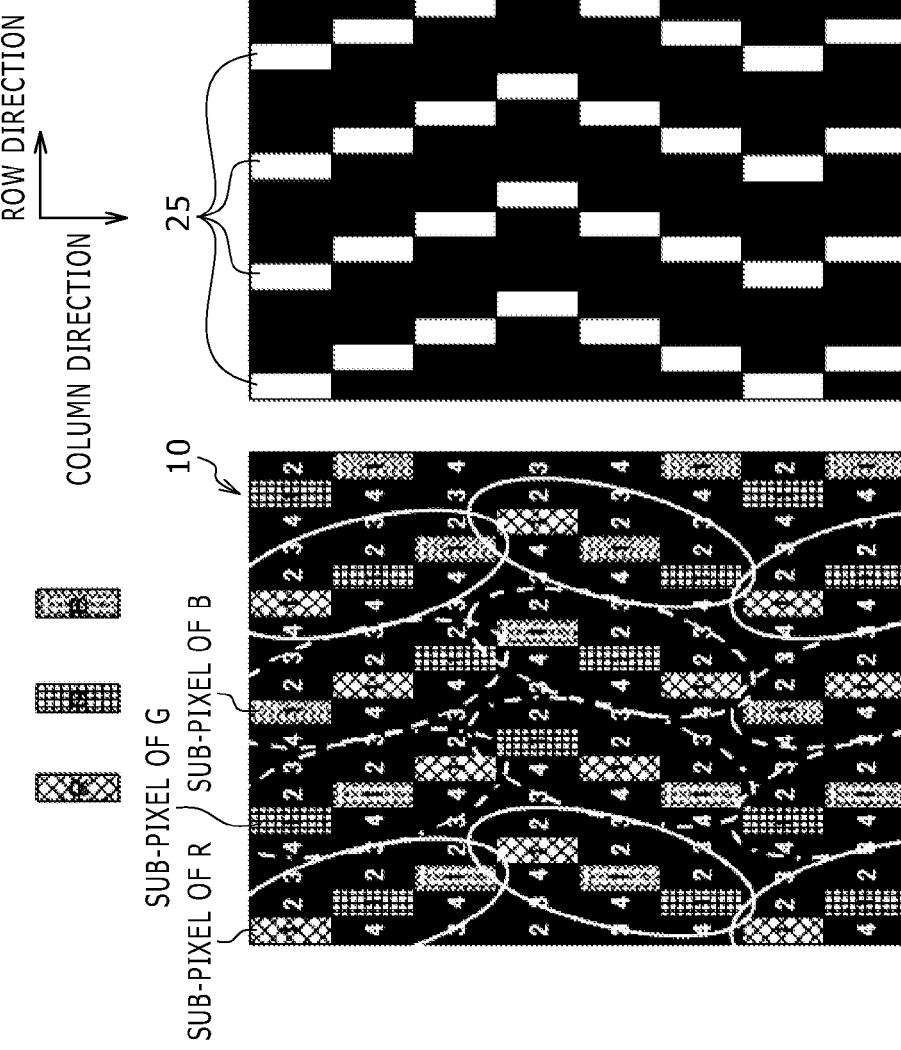

FIGS. 12A to 12C are diagrams for assistance in explaining the color arrangement of the pixels of the image display section and the arrangement of the transmitting sections of the parallax barrier in the case of four viewpoints according to a second example. FIG. 12A shows the color arrangement of the pixels allocated to the first viewpoint at a time of white display. FIG. 12B shows the arrangement of the transmitting sections 25 of the parallax barrier 20. FIG. 12C shows the pixels allocated to the first viewpoint at a time of single-color display (pixels of G in the present example).

The color arrangement of the pixels (sub-pixels) 40 of the image display section 10 is similar to that of the first example. Specifically, as shown in FIG. 7A, the color arrangement of the pixels of the image display section 10 in the case of four viewpoints is the stripe arrangement in which sub-pixels of RGB are for example arranged in that order in units of pixel columns.

For the stripe arrangement of the image display section 10, as shown in FIG. 12B, the transmitting sections 25 of the parallax barrier 20 according to the second example have a step barrier arrangement of three rows as a unit, in which one pixel row has a period of four pixels (sub-pixels) corresponding to the four viewpoints, and the transmitting sections 25 are shifted every row in order by one pixel in the row direction. In addition, this step barrier arrangement in which three rows form one unit is such that the direction of the steps is reversed in the next three rows, and the next three rows are also shifted by one pixel in a direction in which the pixel column number increases (right direction in the figure). This unit of step barrier arrangement constituted by a total of six rows is arranged so as to be repeated in the column direction.

Thus, when the direction of steps is not fixed in the case where the step barrier arrangement is a basic form, the transmitting sections 25 of the parallax barrier 20 according to the second example are arranged such that steps are discontinuous in an oblique direction with three rows as one unit.

Because of the discontinuous arrangement of the transmitting sections 25, as shown in FIG. 12A, the color arrangement of the pixels allocated to the first viewpoint as viewed from a same row is such that an RGB pixel group enclosed by a white solid line, a GBR pixel group enclosed by white alternate long and short dashed lines, and a BRG pixel group enclosed by a white broken line is reversed in terms of the arrangement direction of pixels in the next repetition. In addition, the color arrangement of the pixels forms a pattern in which each pixel group of the next repetition is shifted by one pixel in the direction in which pixel columns are increased. When a single color (G in the present example) is viewed in this color arrangement, as shown in FIG. 12C, the single color is arranged linearly in a certain direction, specifically the oblique direction, but is not arranged in a predetermined number of sub-pixels (five sub-pixels in the present example) or more in succession.

When a same color is thus not arranged linearly in a predetermined number of sub-pixels or more in succession in a certain direction in an arrangement of colors of light allocated by the transmitting sections 25 of the parallax barrier 20 observed when the image display section 10 is viewed from each of the plurality of viewpoints, the absence of oblique information can be avoided at a time of allocating images composed of a monotone set of pixels to the respective viewpoints. It is therefore possible to improve visibility of when displaying images composed of a monotone set of pixels such for example as a geometric figure or a character in particular.

THIRD EXAMPLE

Figure 13C:
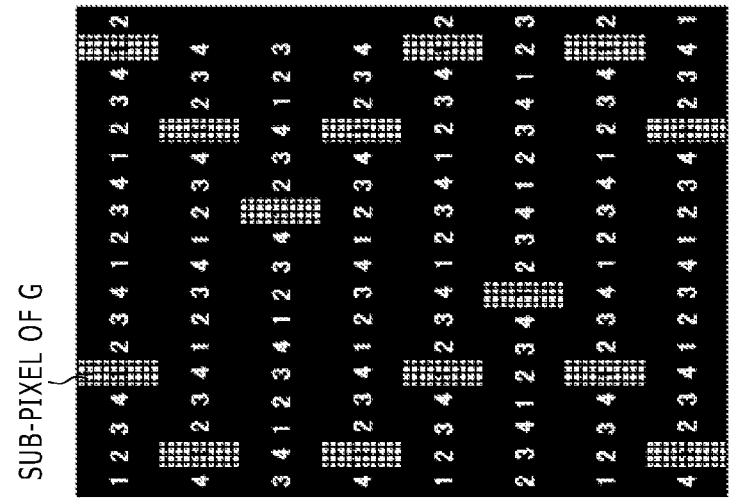
FIGS. 13A, 13B, and 13C are diagrams for assistance in explaining relation between the color arrangement of the pixels of the image display section and the arrangement of the transmitting sections of the parallax barrier in the case of four viewpoints according to a third example.
Figure 13B:
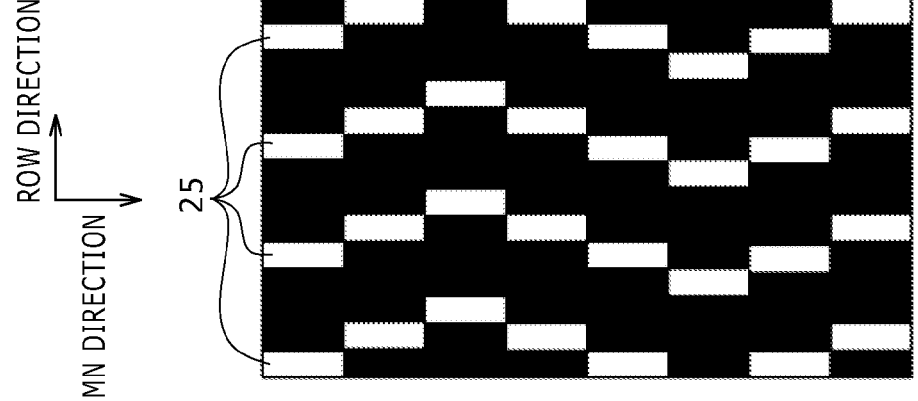
Figure 13A:
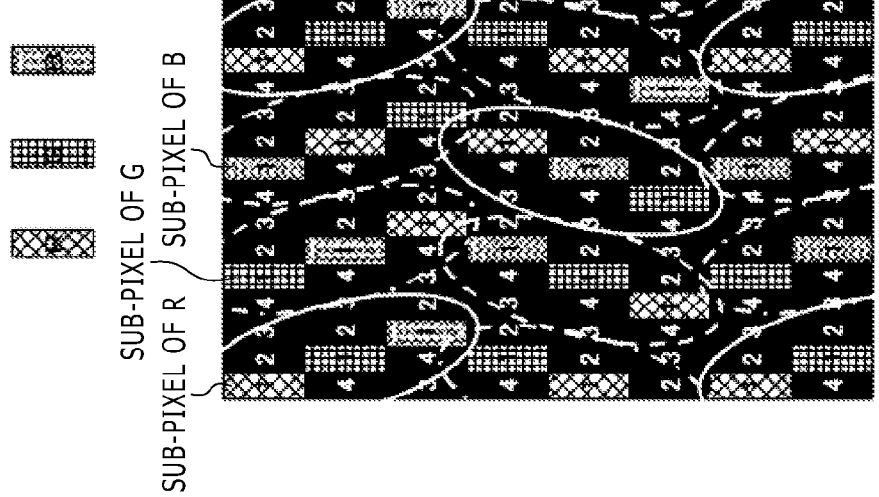

FIGS. 13A to 13C are diagrams for assistance in explaining relation between the color arrangement of the pixels of the image display section and the arrangement of the transmitting sections of the parallax barrier in the case of four viewpoints according to a third example. FIG. 13A shows the color arrangement of the pixels allocated to the first viewpoint at a time of white display. FIG. 13B shows the arrangement of the transmitting sections 25 of the parallax barrier 20. FIG. 13C shows the pixels allocated to the first viewpoint at a time of single-color display (pixels of G in the present example).

The color arrangement of the pixels (sub-pixels) 40 of the image display section 10 is similar to that of the first example. Specifically, as shown in FIG. 7A, the color arrangement of the pixels of the image display section 10 in the case of four viewpoints is the stripe arrangement in which sub-pixels of RGB are for example arranged in that order in units of pixel columns.

For the stripe arrangement of the image display section 10, as shown in FIG. 13B, the transmitting sections 25 of the parallax barrier 20 according to the third example have a step barrier arrangement of three rows as one unit, in which one pixel row has a period of four pixels (sub-pixels) corresponding to the four viewpoints and the transmitting sections 25 are shifted every pixel row in order by one pixel in the row direction. This step barrier arrangement as one unit formed of three rows is arranged in the next three rows such that the direction of the steps is reversed, and also the next three rows are shifted by one pixel in a direction in which pixel columns are decreased (left direction in the figure). The step barrier arrangement of a total of six rows as a unit is arranged so as to be repeated in the column direction.

Thus, when the amount of shift (shift width) of steps and the direction of steps are not fixed in the case where the step barrier arrangement is a basic form, the transmitting sections 25 of the parallax barrier 20 according to the third example are arranged such that steps are discontinuous in an oblique direction with three rows as one unit.

Because of the discontinuous arrangement of the transmitting sections 25, as shown in FIG. 13A, the color arrangement of the pixels allocated to the first viewpoint as viewed from a same row is such that an RGB pixel group enclosed by a white solid line, a GBR pixel group enclosed by white alternate long and short dashed lines, and a BRG pixel group enclosed by a white broken line have a reversed pixel arrangement direction in the next repetition. In addition, the color arrangement of the pixels forms a complex pattern in which each pixel group in the next repetition is shifted by one pixel in the direction in which pixel columns are decreased. When a single color (G in the present example) is viewed in this color arrangement, as shown in FIG. 13C, the single color is arranged linearly in a certain direction, specifically the oblique direction, but is not arranged in a predetermined number of sub-pixels (four sub-pixels in the present example) or more in succession.

When a same color is thus not arranged linearly in a predetermined number of sub-pixels or more in succession in the oblique direction in an arrangement of colors of light allocated by the transmitting sections 25 of the parallax barrier 20 observed when the image display section 10 is viewed from each of the plurality of viewpoints, the absence of oblique information can be avoided at a time an image composed of a monotone set of pixels is allocated to the respective viewpoints. It is therefore possible to improve visibility of when displaying images composed of a monotone set of pixels such for example as a geometric figure or a character in particular.

FOURTH EXAMPLE

Figure 14C:
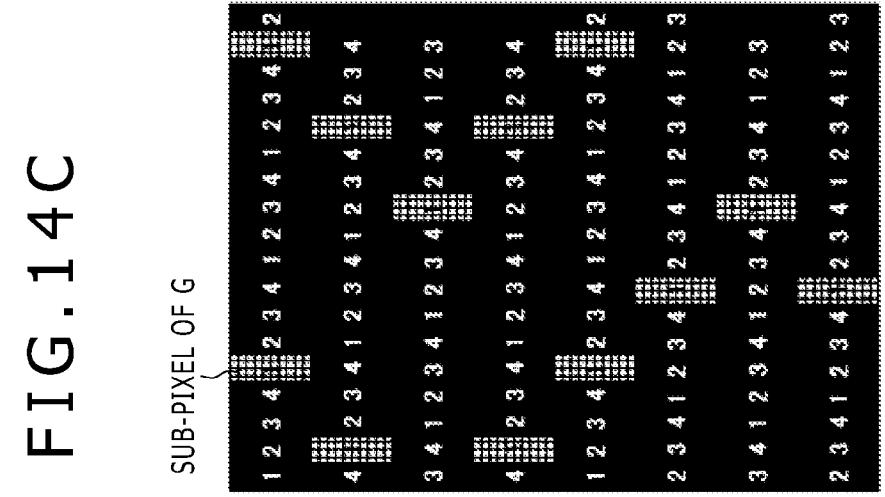
FIGS. 14A, 14B, and 14C are diagrams for assistance in explaining relation between the color arrangement of the pixels of the image display section and the arrangement of the transmitting sections of the parallax barrier in the case of four viewpoints according to a fourth example.
Figure 14B:
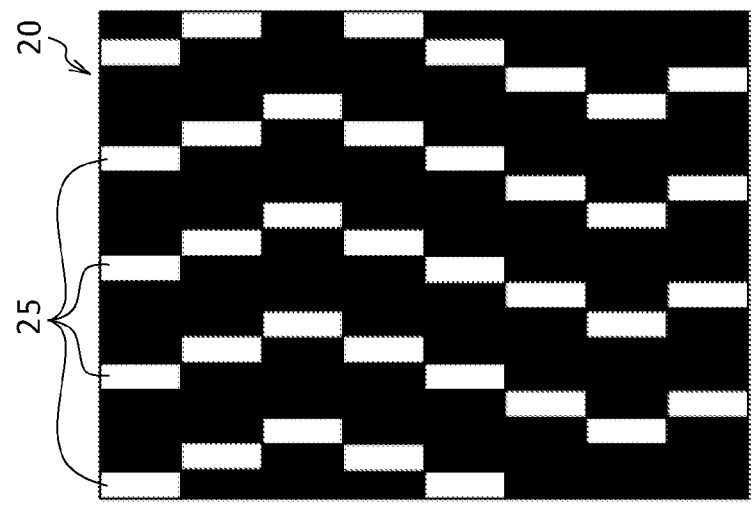
Figure 14A:
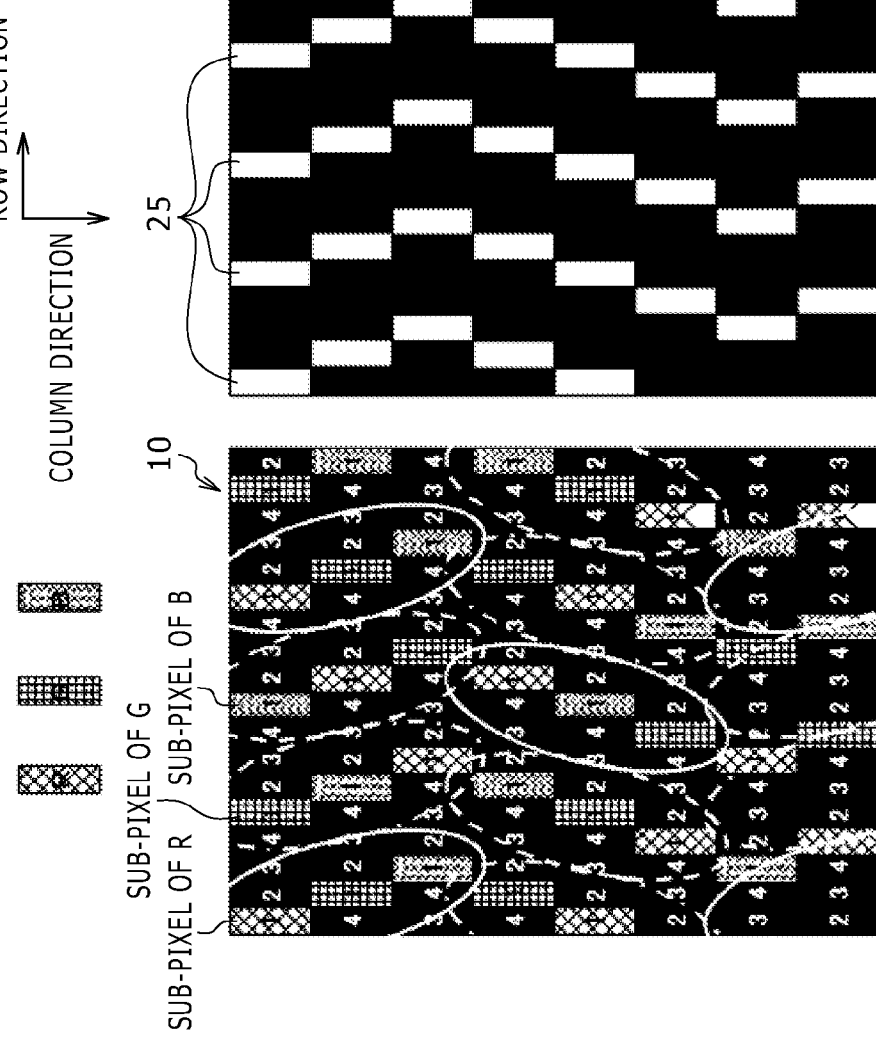

FIGS. 14A to 14C are diagrams for assistance in explaining relation between the color arrangement of the pixels of the image display section and the arrangement of the transmitting sections of the parallax barrier in the case of four viewpoints according to a fourth example. FIG. 14A shows the color arrangement of the pixels allocated to the first viewpoint at a time of white display. FIG. 14B shows the arrangement of the transmitting sections 25 of the parallax barrier 20. FIG. 14C shows the pixels allocated to the first viewpoint at a time of single-color display (pixels of G in the present example).

The arrangement of the transmitting sections 25 of the parallax barrier 20 according to the fourth example is positioned as a modification of the arrangement of the transmitting sections 25 of the parallax barrier 20 according to the third example. Specifically, in the arrangement of the transmitting sections 25 of the parallax barrier 20 according to the third example, three successive rows form one unit, and in the next repetition the direction of steps of the unit is reversed while the unit is shifted by one pixel in the direction in which the pixel column number decreases. This step barrier arrangement formed of a total of six rows as one unit is arranged so as to be repeated in the column direction.

On the other hand, in the arrangement of the transmitting sections 25 of the parallax barrier 20 according to the fourth example, the step barrier arrangement in which three rows form one unit is configured such that the direction of shifting, amount of shifting in pixel units, and/or the reversal (change) of the direction of steps are combined arbitrarily with each other in units of three rows. By adopting such a configuration, the transmitting sections 25 of the parallax barrier 20 according to the fourth example are arranged so as to be discontinuous in an oblique direction with three rows as a unit.

Because of the discontinuous arrangement of the transmitting sections 25 as shown in FIG. 14B, as shown in FIG. 14A, the color arrangement of the pixels allocated to the first viewpoint is a complex pattern in which first six rows are the same as those in the third example but the subsequent color arrangement is different from that of the first six rows. When a single color (G in the present example) is viewed in this color arrangement, as shown in FIG. 14C, the single color is arranged linearly in a certain direction, specifically the oblique direction, but is not arranged in a predetermined number of sub-pixels (five sub-pixels in the present example) or more in succession.

When a same color is thus not arranged linearly in a predetermined number of sub-pixels or more in succession in the oblique direction in each of the arrangements of colors of light allocated by the transmitting sections 25 of the parallax barrier 20, that is, in each of the arrangements observed when the image display section 10 is viewed from each of the plurality of viewpoints, the absence of oblique information can be avoided at a time of allocating images composed of a monotone set of pixels to the respective viewpoints. It is therefore possible to improve visibility when displaying images composed of a monotone set of pixels such for example as a geometric figure or a character in particular.

In the first to fourth examples described above, the step barrier arrangement is adopted as a basic form of the arrangement of the transmitting sections 25 of the parallax barrier 20. However, a similar idea can be applied also to a case where the delta arrangement shown in FIG. 8B is adopted as a basic form. A case employing the parallax barrier 20 of the delta arrangement will be described as a fifth example.

FIFTH EXAMPLE

Figure 15C:
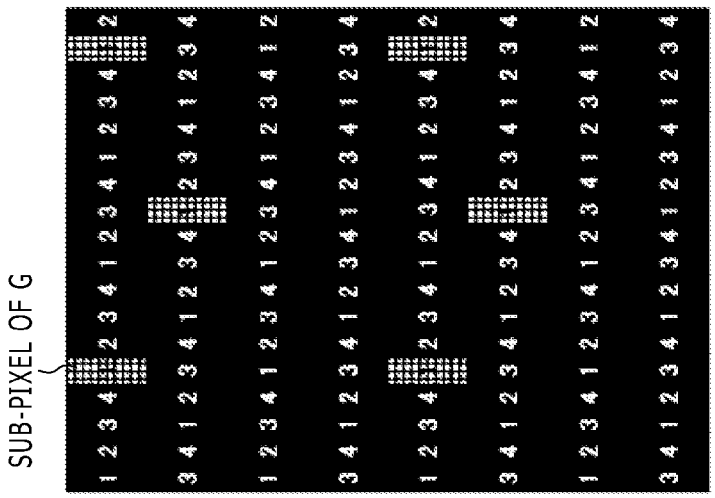
FIGS. 15A, 15B, and 15C are diagrams for assistance in explaining relation between the color arrangement of the pixels of the image display section and the arrangement of the transmitting sections of the parallax barrier in the case of four viewpoints according to a fifth example.
Figure 15B:
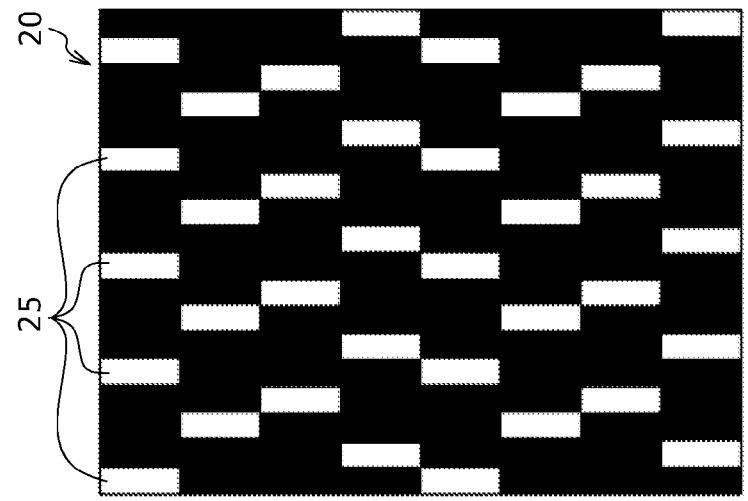
Figure 15A:
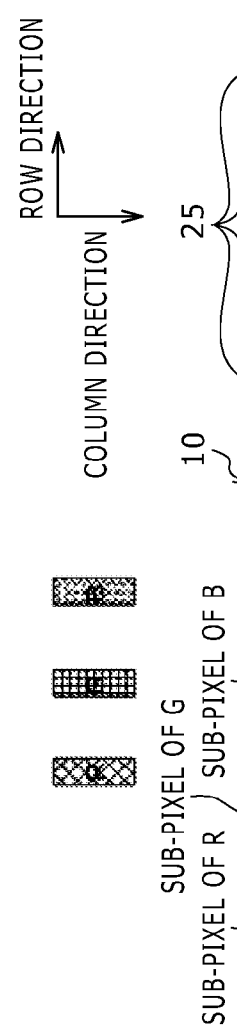

FIGS. 15A to 15C are diagrams for assistance in explaining relation between the color arrangement of the pixels of the image display section and the arrangement of the transmitting sections of the parallax barrier in the case of four viewpoints according to the fifth example. FIG. 15A shows the color arrangement of the pixels allocated to the first viewpoint at a time of white display. FIG. 15B shows the arrangement of the transmitting sections 25 of the parallax barrier 20. FIG. 15C shows the pixels allocated to the first viewpoint at a time of single-color display (pixels of G in the present example).

The color arrangement of the pixels (sub-pixels) 40 of the image display section 10 is similar to that of the first example. Specifically, as shown in FIG. 7A, the color arrangement of the pixels of the image display section 10 in the case of four viewpoints is the stripe arrangement in which sub-pixels of RGB are for example arranged in that order in units of pixel columns.

For the stripe arrangement of the image display section 10, as shown in FIG. 15B, the transmitting sections 25 of the parallax barrier 20 according to the fifth example have such an arrangement relation that, when two upper and lower pixel rows are assumed as a pair, two upper and lower pairs are shifted from each other by three (or one) pixels (sub-pixels) in the row direction. Thus, as is clear from FIG. 15B, the transmitting sections 25 are arranged so as to be discontinuous in the column direction and the oblique direction.

In the case of the arrangement for thus allocating the pixels by the parallax barrier 20 in which the transmitting sections 25 are arranged to be discontinuous in the column direction and the oblique direction, as shown in FIG. 15A, RGB combinations enclosed by white solid lines and RGB combinations enclosed by white broken lines are shifted in the row direction between upper and lower pairs. When a single color (G in the present example) is viewed in this color arrangement, as shown in FIG. 15C, the pixels of G allocated to the first viewpoint are arranged in a scattered manner, and they are not arranged in succession in a certain direction. Therefore, effects similar to those of the first to fourth examples can be obtained.

In the first to fifth examples described above, while the known stripe arrangement is adopted as a basic form of the color arrangement of the pixels 40, the absence of information is avoided at a time of allocating images composed of a monotone set of pixels to respective viewpoints by adapting the arrangement of the transmitting sections 25 of the parallax barrier 20. On the other hand, in a sixth example and a seventh example described below, similar effects are obtained by adapting the color arrangement of the pixels 40 while a known arrangement is adopted for the transmitting sections 25 of the parallax barrier 20.

SIXTH EXAMPLE

FIGS. 16A to 16C are diagrams for assistance in explaining relation between the color arrangement of the pixels of the image display section and the arrangement of the transmitting sections of the parallax barrier in the case of four viewpoints according to a sixth example. FIG. 16A shows the color arrangement of the pixels allocated to the first viewpoint at a time of white display. FIG. 16B shows the arrangement of the transmitting sections 25 of the parallax barrier 20. FIG. 16C shows the pixels allocated to the first viewpoint at a time of single-color display (pixels of G in the present example).

The arrangement of the transmitting sections 25 of the parallax barrier 20 is a well-known step barrier arrangement. Specifically, as shown in FIG. 16B, the arrangement is a step barrier arrangement in which one pixel row has a period of four pixels (sub-pixels) corresponding to the four viewpoints and the transmitting sections 25 are shifted every pixel row sequentially by one pixel in a direction in which pixel column number increases (right direction in the figure).

For this step barrier arrangement of the transmitting sections 25 of the parallax barrier 20, as shown in FIG. 16A, the color arrangement of the pixels 40 of the image display section 10 according to the sixth example has sub-pixels of RGB arranged for example in that order so as to be repeated in units of pixel columns, and three successive rows form one unit. The three pixel rows are arranged repetitively in the column direction such that the repeated units are shifted in order by two pixels (sub-pixels) in a direction in which the pixel column number increases. The color arrangement of the pixels 40 of the image display section 10 according to the sixth example is therefore an arrangement discontinuous in the column direction.

Because of the discontinuous color arrangement of the pixels 40, as shown in FIG. 16A, the color arrangement of the pixels allocated to the first viewpoint as viewed from a same row is such that an RGB pixel group enclosed by a black solid line, a GBR pixel group enclosed by black alternate long and short dashed lines, and a BRG pixel group enclosed by a black broken line are shifted in the row direction in the next repetition. When a single color (G in the present example) is viewed in the color arrangement, as shown in FIG. 16C, the single color is arranged linearly in a certain direction, specifically the oblique direction, but is not arranged in a predetermined number of sub-pixels (four sub-pixels in the present example) or more in succession. Therefore, effects similar to those of the first to fifth examples can be obtained.

SEVENTH EXAMPLE

Figure 17C:
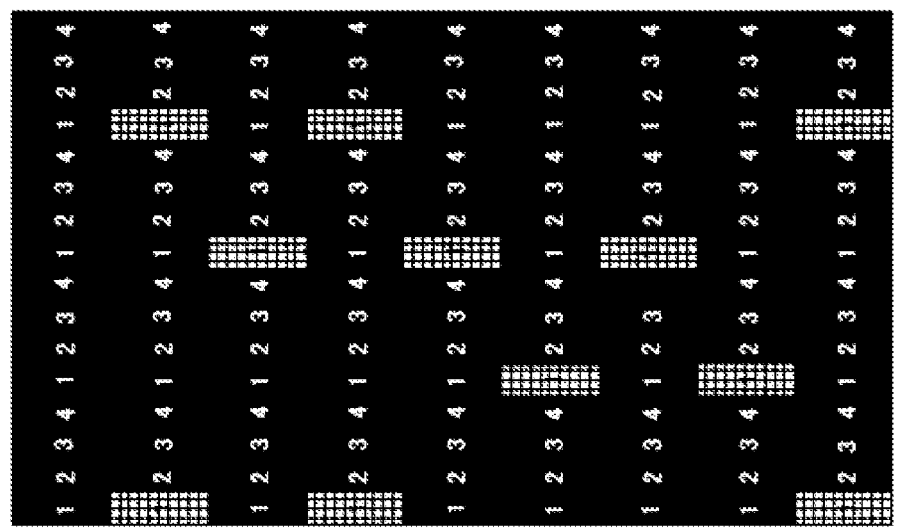
FIGS. 17A, 17B, and 17C are diagrams for assistance in explaining relation between the color arrangement of the pixels of the image display section and the arrangement of the transmitting sections of the parallax barrier in the case of four viewpoints according to a seventh example.
Figure 17B:
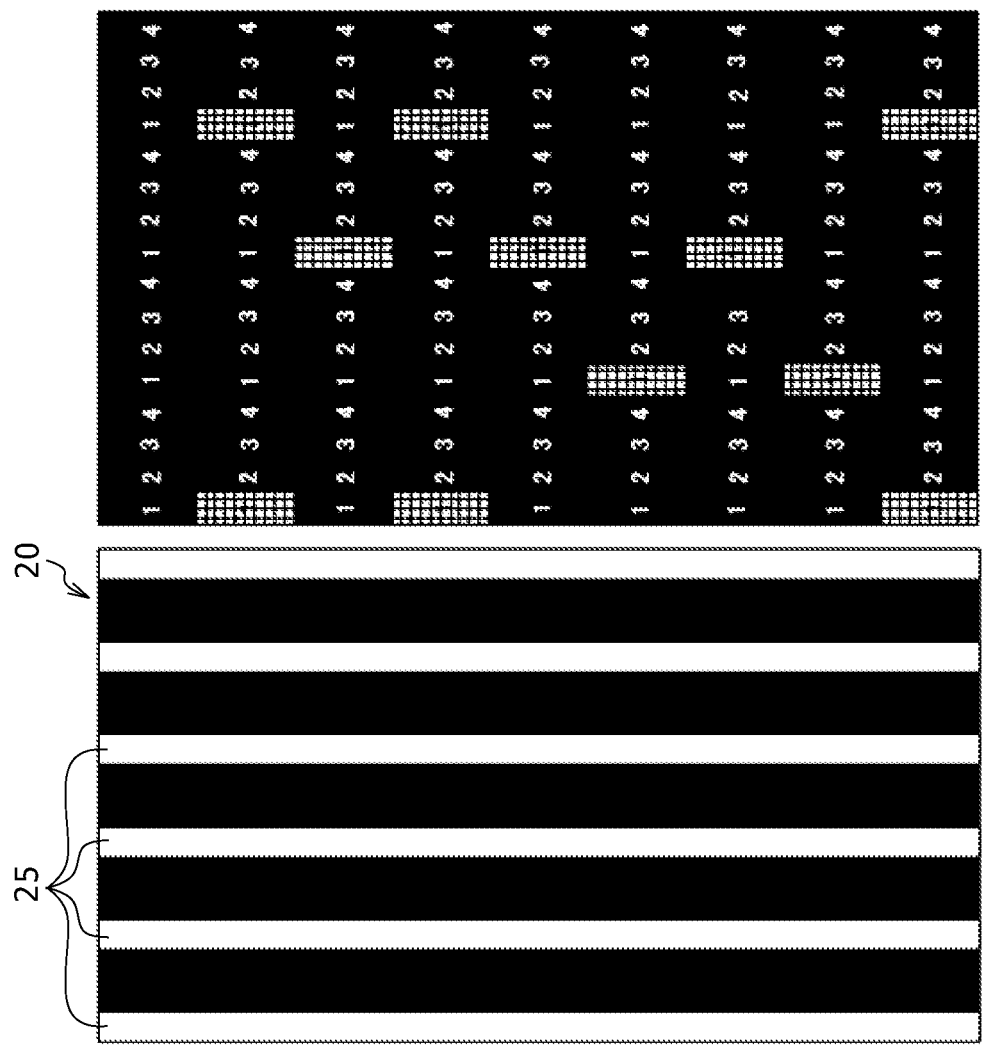
Figure 17A:
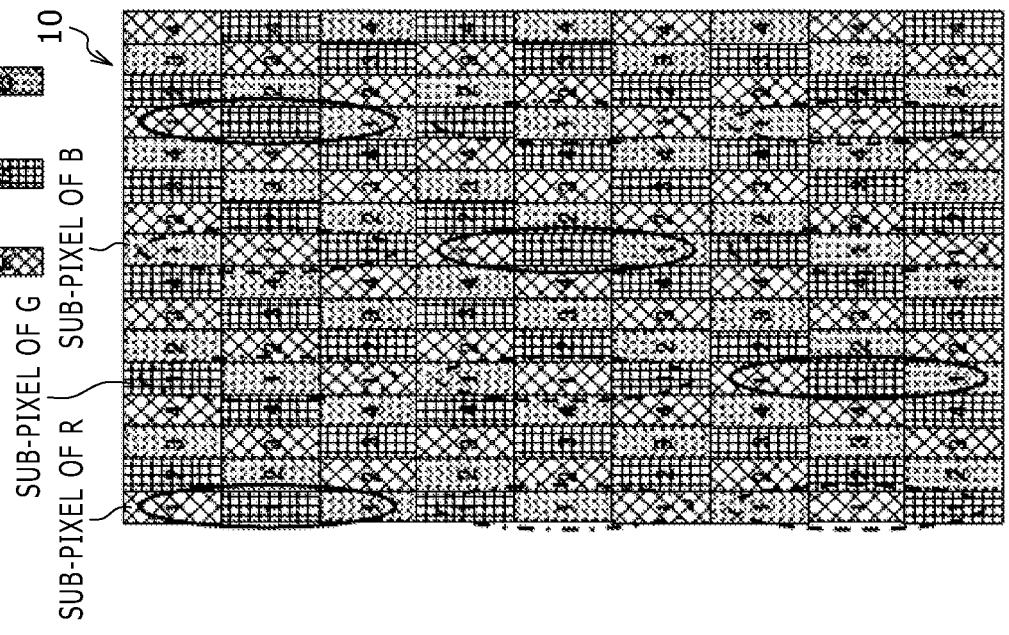

FIGS. 17A to 17C are diagrams for assistance in explaining relation between the color arrangement of the pixels of the image display section and the arrangement of the transmitting sections of the parallax barrier in the case of four viewpoints according to a seventh example. FIG. 17A shows the color arrangement of the pixels allocated to the first viewpoint at a time of white display. FIG. 17B shows the arrangement of the transmitting sections 25 of the parallax barrier 20. FIG. 17C shows the pixels allocated to the first viewpoint at a time of single-color display (pixels of G in the present example).

As shown in FIG. 17B, the arrangement of the transmitting sections 25 of the parallax barrier 20 is a well-known straight barrier (stripe barrier) arrangement. For this straight barrier arrangement of the transmitting sections 25, as shown in FIG. 17A, the color arrangement of the pixels 40 of the image display section 10 according to the seventh example is such that, in one row, sub-pixels of RGB are arranged for example in that order repeatedly. Such a pixel row is repeatedly arranged in the column direction while each row is sequentially shifted by two pixels (sub-pixels) in the direction in which the pixel column number increases. The color arrangement of the pixels 40 of the image display section 10 according to the seventh example is therefore such that sub-pixels of RGB are also repeated in that order in the column direction, similarly to those in the row direction.

In this case as well, where the straight arrangement barrier of the transmitting sections 25 and the color arrangement of the pixels 40 according to the seventh example are combined, when a single color (G in the present example) is viewed, as shown in FIG. 17C, the single color is arranged linearly in a certain direction, specifically the oblique direction, but is not arranged in a predetermined number of sub-pixels (four sub-pixels in the present example) or more in succession. Effects similar to those of the first to fifth examples can therefore be obtained. Particularly, since the transmitting sections 25 of the parallax barrier 20 are in the straight barrier arrangement, it is possible not only to avoid the absence (loss) of an image or the like but also to obtain a display panel with a wide range of visibility in the vertical direction as a panel for stereoscopic image display.

EIGHTH EXAMPLE

Figure 18A:
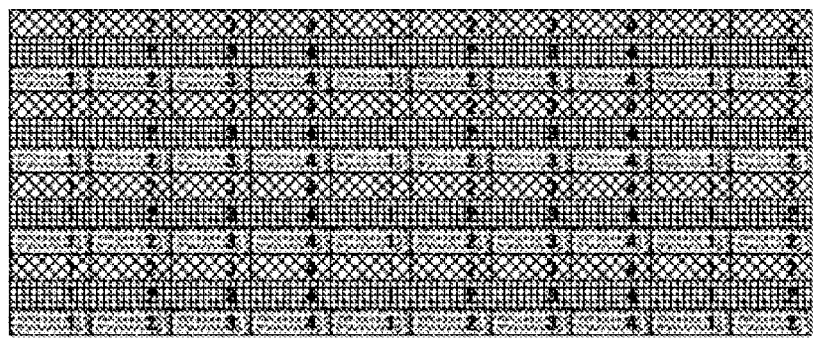
FIGS. 18A, 18B, 18C, and 18D are diagrams for assistance in explaining an eighth example.

An eighth example will next be described with reference to FIGS. 18A to 18D. As shown in FIG. 18A, the color arrangement of the pixels 40 of the image display section 10 according to the eighth example is a horizontal stripe arrangement obtained by rotating 90 degrees a vertical stripe arrangement (see FIG. 7A) formed by arranging sub-pixels of RGB, for example, in that order.

Figure 18B:
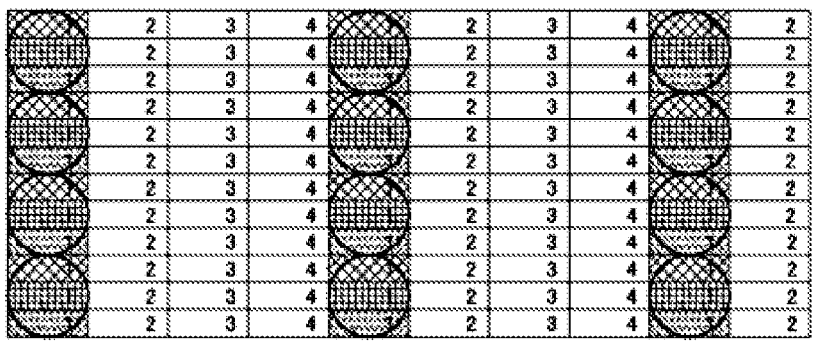

The horizontal stripe arrangement has sets of sub-pixels of RGB arranged in the vertical direction. Therefore, a parallax barrier having a straight barrier arrangement as shown in FIG. 18B may be used as the parallax barrier 20. Circles attached to the unit pixels in FIGS. 18B, 18C, and 18D correspond to the transmitting sections 25 of the parallax barrier 20.

Thus, when the parallax barrier 20 of the straight barrier arrangement is used for the image display section 10 of the horizontal stripe arrangement, the sub-pixels may often be allocated to respective viewpoints in a manner as shown in FIG. 18B in a case of multiple parallaxes. However, when such a configuration is adopted, N−1 consecutive columns are not displayed in a case of N viewpoints (N=4 in the present example). In a case of four viewpoints, for example, supposing that a first column is viewed, the pixels of the second to fourth columns are missing. Thus, the three columns (N−1 consecutive columns for N viewpoints) are missing (not displayed).

Figure 18C:
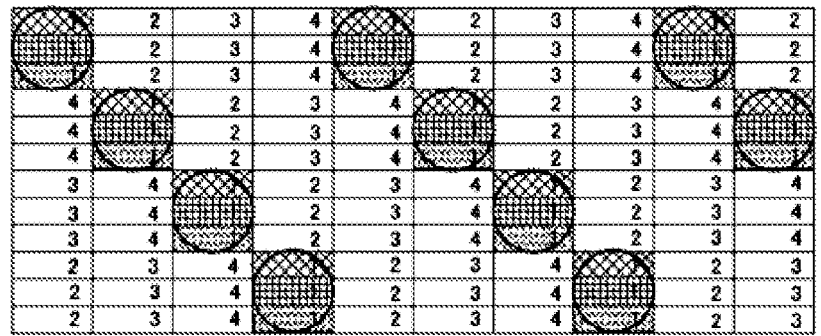
Figure 18D:
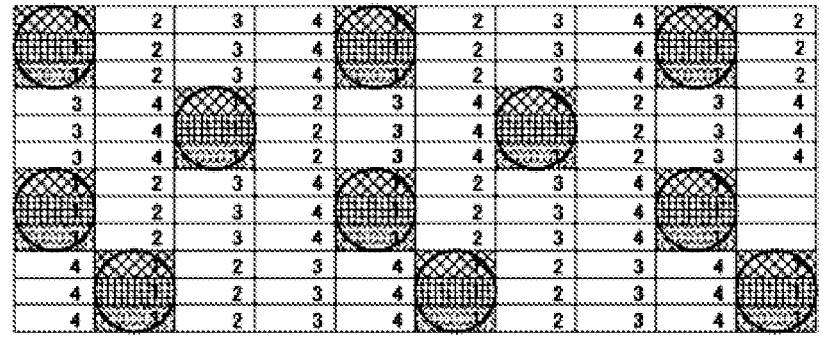

Accordingly, in the eighth example, as shown in FIG. 18C, the transmitting sections 25 of the parallax barrier 20 are in a step barrier arrangement in which three sub-pixels of RGB are set as one unit, and such units are distributed stepwise for each viewpoint with a shift in the row direction by one unit in order. Alternatively, the transmitting sections 25 of the parallax barrier 20 are in a discontinuous step barrier arrangement as shown in FIG. 18D.

The configuration thus combining the image display section 10 of the horizontal stripe arrangement with the parallax barrier 20 of the step barrier arrangement can also provide effects similar to those of the first to fifth examples.

NINTH EXAMPLE

FIGS. 19A to 19C are diagrams for assistance in explaining relation between the color arrangement of the pixels of the image display section and the arrangement of the transmitting sections of the parallax barrier in the case of four viewpoints according to a ninth example. FIG. 19A shows the color arrangement of the pixels (sub-pixels) of the image display section 10. FIGS. 19B and 19C show arrangements of the transmitting sections 25 of the parallax barrier 20.

As shown in FIG. 19A, the color arrangement of the pixels (sub-pixels) 40 of the image display section 10 is the same as in the first to fifth examples, that is, a stripe arrangement in which sub-pixels of RGB are for example arranged in that order in units of pixel columns. On the other hand, the arrangement of the transmitting sections 25 of the parallax barrier 20 according to the ninth example is a step barrier arrangement in which two left and right transmitting sections 25 form a pair so that two consecutive sub-pixels are allocated for a same viewpoint image.

As a step barrier arrangement in which two left and right transmitting sections are paired, as shown in FIG. 19B, a step barrier arrangement with continuous steps, in which two left and right transmitting sections 25 form a pair and shifted every pixel row sequentially by one pixel (sub-pixel), is generally conceivable.

On the other hand, the arrangement of the transmitting sections 25 of the parallax barrier 20 according to the ninth example is such that three pixel rows form one set so as to correspond to the three sub-pixels of RGB. In the set of three pixel rows, steps are formed by shifting pairs of two left and right transmitting sections 25 by one pixel row by row. Between sets of three rows, steps are formed by shifting pairs of two left and right transmitting sections 25 by two pixels set by set. Therefore, as shown in FIG. 19C, the parallax barrier 20 according to the ninth example has a step barrier arrangement with discontinuous steps.

Such a combination of the image display section 10 having the vertical stripe arrangement and the parallax barrier 20 allocating a plurality of consecutive sub-pixels for a same viewpoint image by the step barrier arrangement with discontinuous steps can also provide effects similar to those of the first and fifth examples. The number of consecutive sub-pixels allocated for a same viewpoint image is two in the above description. However, the same is true for three or more consecutive sub-pixels.

(Modifications)

Figure 20B:
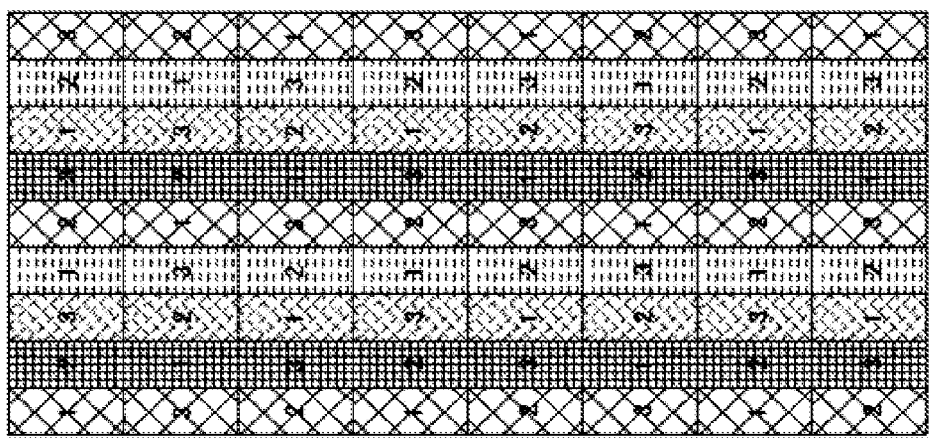
FIGS. 20A and 20B are diagrams showing color arrangements of the pixels of the image display section according to modifications.
Figure 20A:
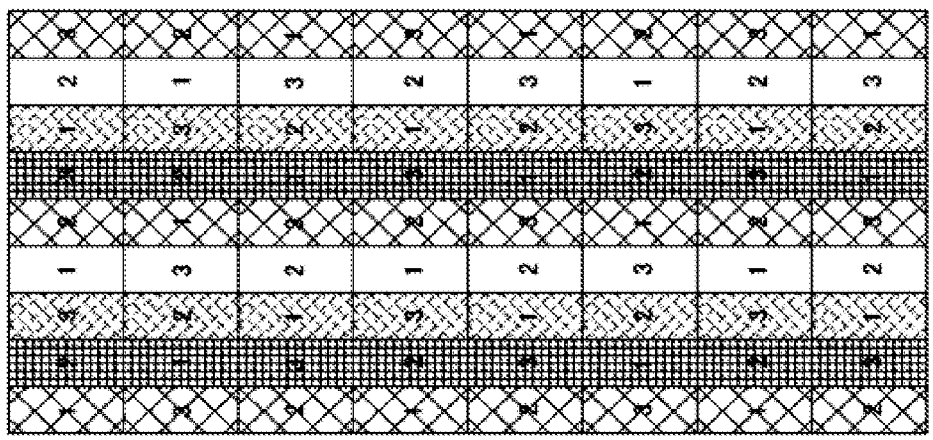

The first to ninth examples have been described above by taking as an example a case where a unit pixel which is one unit for forming a color image is composed of a combination of three sub-pixels corresponding to the three primary colors of RGB. However, the present technology is not limited to this. Examples of other possible combinations are those including another sub-pixel corresponding to another color in addition to the three sub-pixels corresponding to the three primary colors of RGB. The additional sub-pixel may be a sub-pixel corresponding to white (W) as shown in FIG. 20A, or one corresponding to yellow (Y) as shown in FIG. 20B.

Other than the combination of three sub-pixels corresponding to the three primary colors of RGB, a unit pixel may be constituted by a combination of sub-pixels corresponding to complementary colors of cyan (C), magenta (M), and yellow (Y), for example.

Further, in the first to ninth examples, the stripe arrangement is adopted as a basic form of the color arrangement of the pixels (sub-pixels) 40 of the image display section 10. However, the same as in the stripe arrangement applies also to the delta arrangement and other kinds of arrangements.

Embodiments of the present disclosure may take the following configurations.

(1) A display device including:
an image display section in which unit pixels each composed of a plurality of sub-pixels corresponding to a plurality of colors are arranged; and
an optical element having a window section allocating light emitted from the image display section in units of the sub-pixels to a plurality of viewpoints,
wherein a color arrangement of the sub-pixels of the image display section or an arrangement of the window section of the optical element is set such that, when the image display section is viewed from each of the plurality of viewpoints, in an arrangement of colors of light allocated by the window section of the optical element, a same color is not arranged linearly in a predetermined number of sub-pixels or more in succession in any of a row direction, a column direction, and an oblique direction.

(2) The display device according to (1), wherein the image display section displays a plurality of images with parallax.

(3) The display device according to (2), wherein the optical element is a parallax barrier, a lenticular lens, or a liquid crystal lens.

(4) The display device according to any one of (1) to (3), wherein a stripe arrangement is a basic form of the color arrangement of the sub-pixels in the image display section.

(5) The display device according to (3) or (4), wherein, when the optical element is the parallax barrier, a step barrier arrangement or a delta arrangement is a basic form of transmitting sections of the parallax barrier.

(6) The display device according to (5), wherein, when the transmitting sections of the parallax barrier are in the step barrier arrangement, steps of the step barrier arrangement are arranged so as to be discontinuous.

(7) The display device according to any one of (1) to (6), wherein the optical element provides a plurality of images displayed by the image display section three-dimensionally to an image observer.

(8) The display device according to any one of (1) to (6), wherein the optical element provides a plurality of images displayed by the image display section separately to a plurality of image observers.

The present disclosure contains subject matter related to that disclosed in Japanese Priority Patent Application JP 2011-230300 filed in the Japan Patent Office on Oct. 20, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
    an image display section in which unit pixels each composed of a plurality of RGB sub-pixels corresponding to a plurality of colors are arranged in a row direction and a column direction in a matrix manner; and
    an optical element having a window section allocating light emitted from the image display section in units of the sub-pixels to a plurality of viewpoints,
    wherein the window section is controlled such that among the plurality of RGB sub-pixel groups, each RGB sub-pixel is associated with a respective viewpoint, a color of each RGB sub-pixel in a respective viewpoint is different from a color of an adjacent RGB sub-pixel in the respective viewpoint in both the row direction and the column direction, and four or RGB sub-pixels of a single color are not arranged along an oblique direction consecutively in the respective viewpoint.

2. The display device according to claim 1, wherein the image display section displays a plurality of images with parallax.

3. The display device according to claim 2, wherein the optical element is a parallax barrier, a lenticular lens, or a liquid crystal lens.

4. The display device according to claim 3, wherein, when the optical element is the parallax barrier, a step barrier arrangement or a delta arrangement is a form of transmitting sections of the parallax barrier.

5. A display device comprising:
    an image display section in which unit pixels each composed of a plurality of sub-pixels corresponding to a plurality of colors are arranged; and
    an optical element having a window section allocating light emitted from the image display section in units of the sub-pixels to a plurality of viewpoints, wherein
    the window section is controlled such that the image display section includes a plurality of RGB sub-pixel groups, each RGB sub-pixel group being associated with a respective viewpoint, and more than a predetermined number of the RGB sub-pixel groups do not exist along a straight line in any direction,
    the optical element is a parallax barrier, a lenticular lens, or a liquid crystal lens,
    when the optical element is the parallax barrier, a step barrier arrangement or a delta arrangement is a form of transmitting sections of the parallax barrier, and
    when the transmitting sections of the parallax barrier are in the step barrier arrangement, steps of the step barrier arrangement are arranged so as to be discontinuous.

6. The display device according to claim 1, wherein a stripe arrangement is a basic form of the color arrangement of the RGB sub-pixels in the image display section.

7. The display device according to claim 1, wherein the optical element provides a plurality of images displayed by the image display section three-dimensionally to an image observer.

8. The display device according to claim 1, wherein the optical element provides a plurality of images displayed by the image display section separately to a plurality of image observers.

9. A display device comprising:
    an image display section in which unit pixels each composed of a plurality of sub-pixels corresponding to a plurality of colors are arranged; and
    an optical element having a window section allocating light emitted from the image display section in units of the sub-pixels to a plurality of viewpoints, wherein
    a color arrangement of the sub-pixels of the image display section or an arrangement of the window section of the optical element is set such that, when the image display section is viewed from each of the plurality of viewpoints, in an arrangement of colors of light allocated by the window section of the optical element, a same color is not arranged linearly in a predetermined number of sub-pixels or more in succession in any of a row direction, a column direction, and an oblique direction,
    the image display section displays a plurality of images with parallax,
    the optical element is a parallax barrier, a lenticular lens, or a liquid crystal lens,
    when the optical element is the parallax barrier, a step barrier arrangement or a delta arrangement is a basic form of transmitting sections of the parallax barrier, and
    when the transmitting sections of the parallax barrier are in the step barrier arrangement, steps of the step barrier arrangement are arranged so as to be discontinuous.

10. A display device comprising:
    an image display section in which unit pixels each composed of a plurality of sub-pixels corresponding to a plurality of colors are arranged; and
    an optical element having a window section allocating light emitted from the image display section in units of the sub-pixels to a plurality of viewpoints, wherein the window section is controlled such that, in each of the plurality of viewpoints, a predetermined number of adjacent sub-pixels corresponding to a given color and a given viewpoint do not exist along a straight line in any direction, the image display section displays a plurality of images with parallax, the optical element is a parallax barrier, a lenticular lens, or a liquid crystal lens, when the optical element is the parallax barrier, a step barrier arrangement or a delta arrangement is a basic form of transmitting sections of the parallax barrier, and when the transmitting sections of the parallax barrier are in the step barrier arrangement, steps of the step barrier arrangement are arranged so as to be discontinuous.

11. The display device according to claim 10, wherein the step barrier arrangement includes at least one continuous portion.

* * * * *